United States Patent
Kasahara et al.

(10) Patent No.: US 6,707,314 B2
(45) Date of Patent: Mar. 16, 2004

(54) INTEGRATED CIRCUIT DEVICE, ELECTRONIC EQUIPMENT, AND METHOD OF PLACEMENT OF AN INTEGRATED CIRCUIT DEVICE

(75) Inventors: Shoichiro Kasahara, Minowa-machi (JP); Chisato Akiyama, Himo (JP); Fumikazu Komatsu, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 5 days.

(21) Appl. No.: 10/141,846

(22) Filed: May 10, 2002

(65) Prior Publication Data

US 2002/0171577 A1 Nov. 21, 2002

(30) Foreign Application Priority Data

May 11, 2001 (JP) ........................................ 2001-141998

(51) Int. Cl.[7] ............................................. H03K 19/177
(52) U.S. Cl. ............................. 326/38; 326/39; 326/41; 716/17
(58) Field of Search ................................ 326/38–41, 83, 326/86, 90; 716/1–17

(56) References Cited

U.S. PATENT DOCUMENTS 6,150,837 A * 11/2000 Beal et al. .................... 326/39

FOREIGN PATENT DOCUMENTS

| JP | A 2000-138292 | 5/2000 |
|----|---------------|--------|
| JP | A 2000-148716 | 5/2000 |

* cited by examiner

*Primary Examiner*—Vibol Tan
(74) *Attorney, Agent, or Firm*—Oliff & Berridge, PLC

(57) ABSTRACT

A macrocell MC1 including a physical-layer circuit in accordance with USB 2.0 or the like is placed at a corner of an integrated circuit device ICD. Data terminals DP and DM are placed in an I/O region IOR1 along a side SD1; and power terminals PVDD, PVSS, XVDD, and XVSS and clock terminals XI and XO of a clock generation circuit and a sampling clock circuit are placed in an I/O region IOR2 along a side SD2. An interface region and a macrocell MC2 including user-specified logic are provided along a side SD3. A reception circuit is placed on a DR1 side of IOR1, a clock generation circuit is placed on a DR2 side of IOR2, and a sampling clock generation circuit is placed on the DR1 side of the reception circuit and also the DR2 side of the clock generation circuit. A transmission circuit is placed on the DR2 side of the reception circuit and on the DR1 side of the data terminals DP and DM.

33 Claims, 17 Drawing Sheets

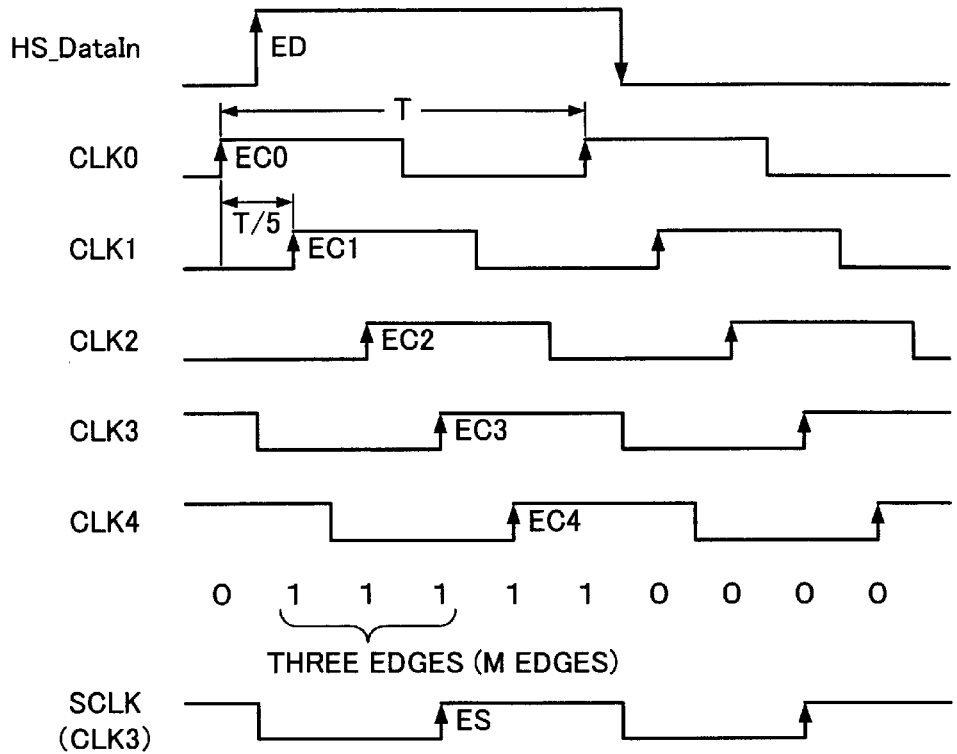
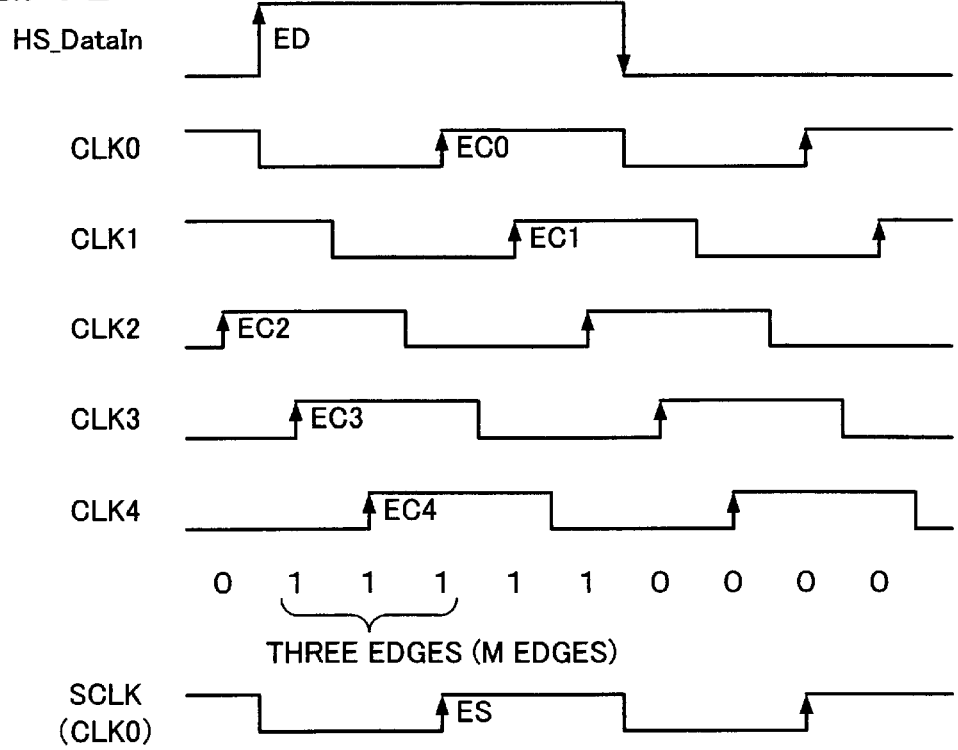

INTEGRATED CIRCUIT DEVICE, ELECTRONIC EQUIPMENT, AND METHOD OF PLACEMENT OF AN INTEGRATED CIRCUIT DEVICE

Japanese patent application no. 2001-141998 filed on May 11, 2001 is hereby incorporated by reference in its entirety.

BACKGROUND

The present invention relates to an integrated circuit device, electronic equipment, and a method of placing (layout) an integrated circuit device.

The universal serial bus (USB) standard has recently attracted attention as an interface standard for connections between personal computers and peripheral equipment (broadly speaking: electronic equipment). This USB standard has the advantage of enabling the use of connectors of the same standard to connect peripheral equipment such as a mouse, keyboard, and printer, which are connected by connectors of different standards in the prior art, and of enabling the implementation of plug-and-play and hot-plug features.

In comparison with the IEEE 1394 standard, which is also attracting notice as a standard for the same serial bus interface, this USB standard has a problem in that the transfer speed thereof is slower.

In this case, attention is focussed on the decision to use the USB 2.0 standard which can implement a data transfer speed of 480 Mbps (in HS mode), far faster than that of the previous USB 1.1 standard, while maintaining backward compatibility with USB 1.1. The USB 2.0 transceiver macrocell interface (UTMI), which has defined interface specifications for parts of the physical-layer and a logical-layer circuit under USB 2.0, has also been proposed.

In addition to the full-speed (FS) mode defined by the prior-art USB 1.1, USB 2.0 has provided a transfer mode called high-speed (HS) mode. Since data transfer in this HS mode is at 480 Mbps, this enables the implementation of data transfer at a much higher speed than the data transfer at 12 Mbps of FS mode. This USB 2.0 therefore makes it possible to provide an interface that is optimal for storage devices such as hard disk drives and optical disk drives that require fast transfer speeds.

With USB 2.0, however, it is necessary to send and receive small-amplitude signals at far higher speeds than those under USB 1.1. The physical-layer circuit that processes such small-amplitude signals is therefore required to have a high level of sophistication, and it is desirable with UTMI-standard macrocells (megacells or macro blocks) including such a physical-layer circuit that the cell placement and routing should be done manually.

An integrated circuit device including a UTMI-standard macrocell, on the other hand, is combined with a logical-layer circuit such as that for a serial interface engine (SIE) or user-specified logic, which means that the configuration and scale of this logical-layer circuit will vary depending on the user of the integrated circuit device. When designing and fabricating an integrated circuit device including such a macrocell, a technical problem is to respond to diverse user demands while maintaining the high level of sophistication of the physical-layer circuit.

SUMMARY

An integrated circuit device in accordance with one aspect of the present invention relates to an integrated circuit device including a plurality of macrocells, the integrated circuit device comprising:

a first macrocell which includes at least a physical-layer circuit conforming to a given interface standard for performing data transfer through a bus and; and a second macrocell which includes a circuit in an upper layer of the physical layer, wherein the first macrocell is placed in such a manner that a corner portion of the first macrocell that is a portion at which first and second sides of the first macrocell intersect is positioned at a corner portion of the integrated circuit device.

BRIEF DESCRIPTION OF THE SEVERAL VIEWS OF THE DRAWING

FIGS. 7A and 7B are timing waveform charts illustrating the operation of the sampling clock generation circuit;

DETAILED DESCRIPTION

Figure 1:
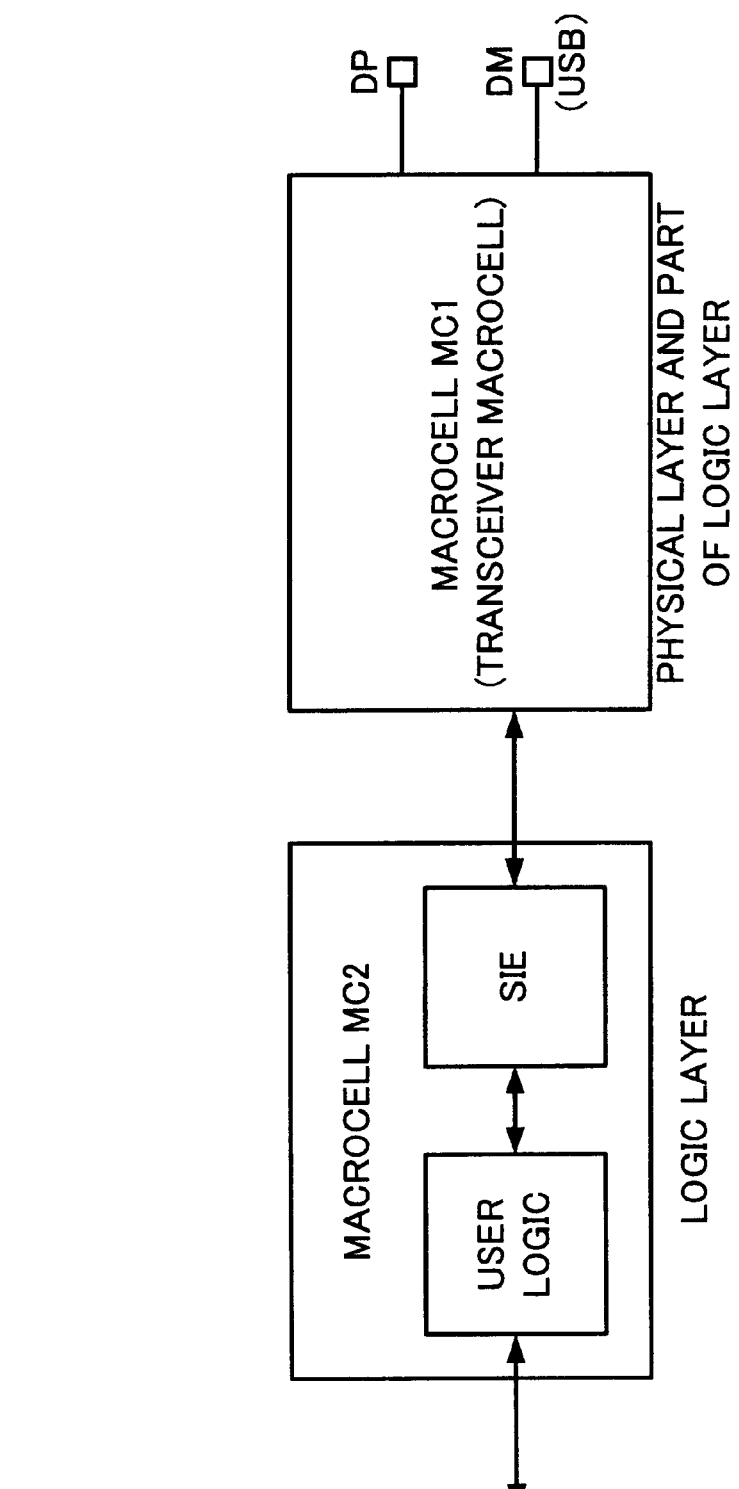
FIG. 1 is a schematic function block diagram of an integrated circuit device in accordance with this embodiment.

Embodiments of the present invention are in detail described below.

Note that these embodiments described hereunder do not in any way limit the scope of the invention defined by the claims laid out herein. Note also that all of the elements of the embodiments should not be taken as essential requirements to the means of the present invention.

According to one embodiment of the present invention, there is provided an integrated circuit device including a plurality of macrocells, the integrated circuit device comprising:

a first macrocell which includes at least a physical-layer circuit conforming to a given interface standard for performing data transfer through a bus and; and a second macrocell which includes a circuit in an upper layer of the physical layer, wherein the first macrocell is placed in such a manner that a corner portion of the first macrocell that is a portion at which first and second sides of the first macrocell intersect is positioned at a corner portion of the integrated circuit device.

In the integrated circuit device, the first macrocell is placed in such a manner that a corner portion of the first macrocell, which comprises a physical-layer (such as lowest-layer) circuit, is positioned at a corner portion of the integrated circuit device (including cases in which the corner portions substantially match). A second macrocell comprising a circuit of an upper layer of the physical layer is placed in a region that differs from that of the first macrocell, by way of example. This makes it possible to incorporate an upper-layer circuit of various different configurations as a second macrocell in the integrated circuit device, while maintaining the high level of sophistication of the physical-layer circuit comprised by the first macrocell.

Note that part of the upper-layer circuit may be comprised within the first macrocell. In addition, the integrated circuit device could also comprise macrocells other than the first and second macrocells.

In the integrated circuit device, a data terminal connected to the bus of the given interface standard may be placed in a first I/O region placed along the first side of the first macrocell; and at least one of a clock terminal, or a power terminal of a circuit that generates a clock for data transfer through the data terminal may be placed in a second I/O region that is placed along the second side of the first macrocell.

This makes it possible to use a clock that is input from the second side towards the fourth side, to sample data that is flowing from the first side towards the third side, by way of example, enabling the implementation of rational data transfer with no waste.

In the integrated circuit device, an interface region for exchanging signals between the first and second macrocells may be provided along at least one of a third side of the macrocell opposite to the first side and a fourth side opposite to the second side.

This makes it easy to keep delays and delivery timing of signals exchanged between the first and second macrocells, for example, to within suitable ranges.

Note that a buffer for passing signals from the first macrocell to the second macrocell and a buffer for passing signals from the second macrocell to the first macrocell may be provided in the interface region.

In the integrated circuit device, the first macrocell may comprise:

a reception circuit which is connected to a data terminal connected to the bus of the given interface standard, and receives data through the data terminal;

a clock generation circuit which generates a clock of a given frequency; and a sampling clock generation circuit which generates a sampling clock for data transferred through the data terminal, based on a clock generated by the clock generation circuit, the reception circuit may be placed on a first direction side of a first I/O region placed along the first side of the first macrocell, the first direction being a direction from the first side toward a third side of the first macrocell, the third side being opposite to the first side, the clock generation circuit may be placed on a second direction side of a second I/O region placed along the second side of the first macrocell, the second direction being a direction from the second side toward a fourth side of the first macrocell, the fourth side being opposite to the second side, and the sampling clock generation circuit may be placed on the first direction side of the reception circuit and on the second direction side of the clock generation circuit.

This makes it possible to shorten the distance between the reception circuit and the sampling clock generation circuit and the distance between the clock generation circuit and the sampling clock generation circuit, thus enabling a reduction in the adverse effects caused by parasitic capacitances and parasitic resistances in the wiring on the circuit operation.

Note that the sampling clock generation circuit could also be placed adjacent to the reception circuit in the first direction and adjacent to the clock generation circuit in the second direction.

In the integrated circuit device, the clock generation circuit may generate first to Nth clocks having the same frequency and different phases, and the sampling clock generation circuit may comprise:

an edge detection circuit which detects between which edges among edges of the generated first to Nth clocks, a data edge exists; and a clock selection circuit which selects one of the first to Nth clocks, based on edge detection information of the edge detection circuit, and outputs the selected clock as the sampling clock.

In the integrated circuit device, it can be detected that between which edges among edges of multi-phase first to Nth clocks, a data edge exists. For example, it is detected whether a data edge exists between edges of the first and second clocks, or between edges of the second and third clocks. A clock is selected from among the first to Nth clocks, based on the thus-obtained edge detection information (information indicating that between which edges of clocks, a data edge exists), and that clock is output as the sampling clock.

In the integrated circuit device, it may be possible to generate a sampling clock of data with a simple configuration by which the selection of a clock from first to Nth clocks is based on edge detection information. It is therefore possible to generate a sampling clock that is suitable for sampling even data that is input in synchronization with a high-speed clock, with a small circuit structure.

In the integrated circuit device, first power terminals which supply power sources to the clock generation circuit and second power terminals which supply power sources to the sampling clock generation circuit may be placed in the second I/O region, the clock generation circuit may be placed adjacent to the first power terminals in the second direction, and a region of capacitive element may be placed adjacent to the second power terminals in the second direction, one end of the capacitive element being connected to a power terminal for a higher potential of the second power terminals and the other end thereof being connected to a power terminal for a lower potential.

This makes it possible to shorten the length of the power source wiring between the first power terminals and the clock generation circuit, thus enabling suppression of the voltage drop from the power source to a minimum.

Changes in the voltage of the first power terminals can be efficiently stabilized at a location close to the first power terminals, making it possible to ensure stable operation of a circuit such as the sampling clock generation circuit.

In the integrated circuit device, the first macrocell may comprise:

a reception circuit which is connected to a data terminal connected to the bus of the given interface standard, and receives data through the data terminal; and a detection circuit which is connected to the data terminal, and detects whether or not data received through the data terminal is valid, and the reception circuit and the detection circuit may be placed to be adjacent each other in a second direction, the second direction being a direction from the second side toward a fourth side of the first macrocell, the fourth side being opposite to the second side.

This makes it possible to efficiently prevent errors such as the transfer of erroneous received data to a later-stage circuit, enabling the implementation of stabilized circuit operation.

In the integrated circuit device, the first macrocell may comprise:

a reception circuit which is connected to a data terminal connected to the bus of the given interface standard, and receives data through the data terminal; and a transmission circuit which is connected to the data terminal, and transmits data through the data terminal, and the transmission circuit may be placed on a second direction side of the reception circuit, the second direction being a direction from the second side toward a fourth side of the first macrocell, the fourth side being opposite to the second side.

This makes it possible to shorten the path of the clock used for sampling the received data, by way of example, and also prevent the occurrence of situations such as an overlapping of the path of that clock and the path for transmitted data.

In the integrated circuit device, the first macrocell may comprise:

a reception circuit which is connected to a data terminal connected to the bus of the given interface standard, and receives data through the data terminal; and a transmission circuit which is connected to the data terminal, and transmits data through the data terminal, and the transmission circuit and the data terminal may be placed to be adjacent in the first direction, the first direction being a direction from the first side toward a third side of the first macrocell, the third side being opposite to the first side.

This makes it possible to shorten the distance between the transmission circuit and the data terminal, thus enabling suppression to the minimum of adverse effects due to parasitic resistances, capacitances, and inductances in the wiring paths for the data terminals.

In the integrated circuit device, the first macrocell may be a macrocell, of which routing and circuit cell placement are fixed; and the second macrocell may be a macrocell, of which routing and circuit cell placement are automatically carried out.

This makes it possible to incorporate circuits of various configurations enabled by automatic placement-routing as the second macrocell in the integrated circuit device, while maintaining the high level of sophistication of the physical layer of the first macrocell.

In the integrated circuit device, the given interface standard may be the universal serial bus (USB) standard.

The given interface standard in this case can be the USB 2.0 standard or a standard that is further developed from the USB 2.0 standard.

According to another embodiment of the present invention, there is provided electronic equipment comprising any of the above described integrated circuit devices, and a device which performs output processing, fetch processing, or storage processing on data transferred through the integrated circuit device and the bus.

This makes it possible to incorporate an integrated circuit device comprising a highly sophisticated physical-layer circuit into electronic equipment, thus enabling an increase in the performance of that electronic equipment. It is possible to incorporate integrated circuit devices of various circuit configurations into electronic equipment by changing the circuit configuration of the second macrocell, enabling compliance with diverse user requirements.

The embodiments of the present invention are described in detail below, with reference to the accompanying drawings.

1. Circuit Configuration

As shown in FIG. 1, an integrated circuit device (data transfer control device) in accordance with this embodiment includes a macrocell MC1 (a first macrocell) and a macrocell MC2 (a second macrocell). Note that these macrocells MC1 and MC2 (macrocells or macroblocks) are units of medium-scale or large-scale circuits having logic functions. The integrated circuit device in accordance with this embodiment could also include three or more macrocells.

In FIG. 1, MC1 is a macrocell including at least a physical-layer circuit of an interface standard (such as USB or IEEE 1394) that performs data transfer through a bus (such as a serial bus). Taking USB 2.0 (or a standard developed from USB 2.0) as an example, a transceiver macrocell of specifications defined by the USB 2.0 Transceiver Macrocell Interface (UTMI) may be used as MC1. In that case, MC1 includes part of a physical-layer circuit and a logical-layer circuit.

MC2, on the other hand, is a macrocell that includes a circuit in an upper layer of the physical layer (such as logical-layer, protocol-layer, or application-layer). Taking USB 2.0 as an example, MC2 includes a logical-layer circuit (other than the logical-layer circuit included within MC1), such as that for the serial interface engine (SIE) and user-specified logic (device-specific circuit).

Note that a macrocell that includes a physical-layer circuit may be used as MCI in FIG. 1. In addition, the macrocell MC2 could include at least a circuit of a layer higher than the physical layer.

Figure 2:
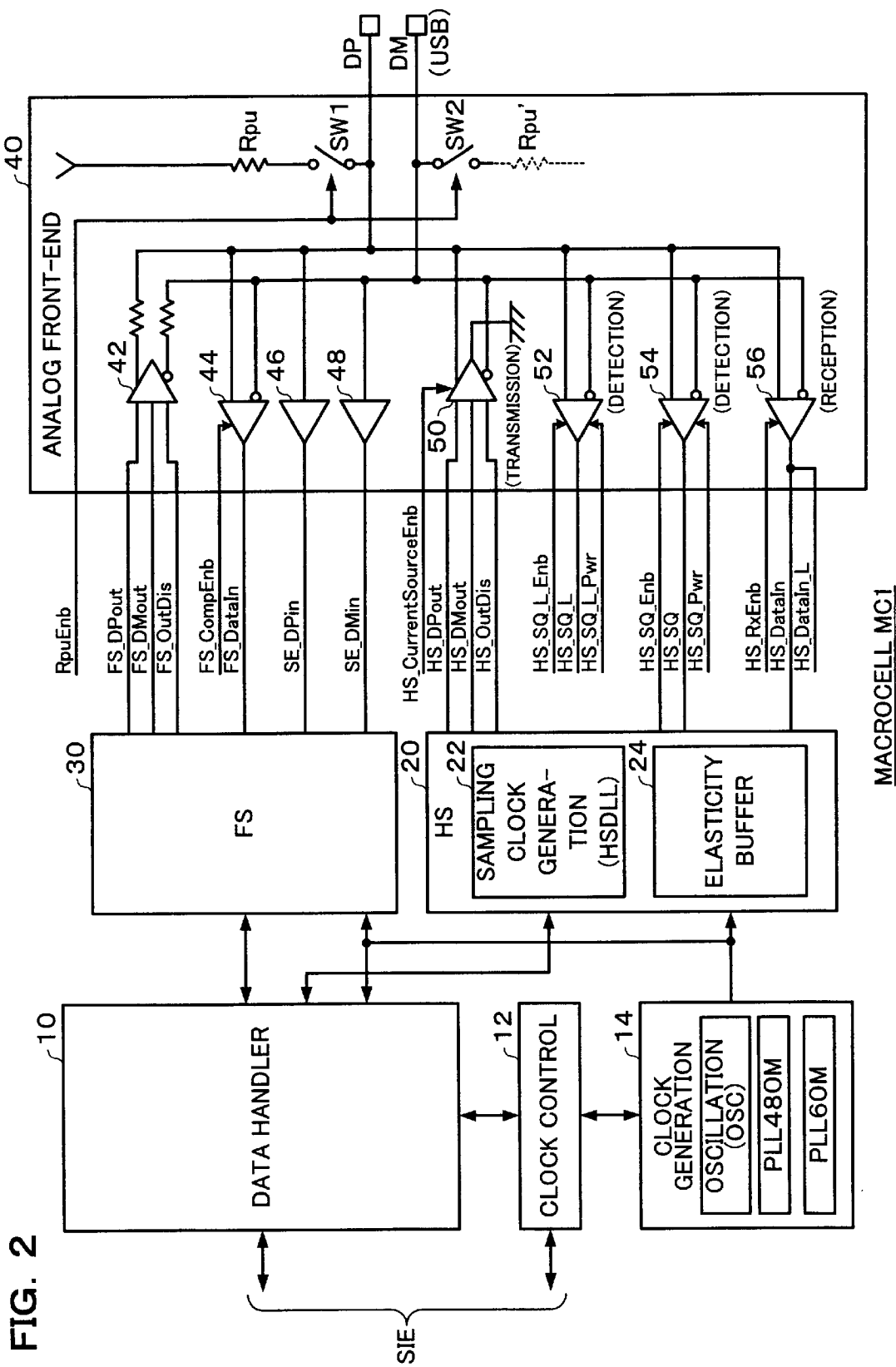
FIG. 2 shows an example of the circuit configuration of a macrocell MC1.

An example of the configuration of the macrocell MC1 is shown in FIG. 2.

The macrocell MC1 (the first macrocell) includes a data handler circuit 10, a clock control circuit 12, a clock generation circuit 14, a high-speed (HS) circuit 20, and a full-speed (FS( )) circuit 30. These circuits are logical-layer circuits. The macrocell MC1 also includes an analog front-end circuit 40 that is a physical-layer circuit. Note that the macrocell MC1 does not necessarily include all of the circuit blocks shown in FIG. 2; some of them may be omitted from the configuration.

The data handler circuit 10 (broadly speaking: a given circuit for performing data transfer) performs various types of processing for transferring data in conformation with a standard such as USB. More specifically, during transmission, it performs processing such as attaching synchronization (SYNC), start of packet (SOP), and end of packet (EOP) codes to the data to be transmitted, and bit stuffing. During reception, on the other hand, it performs processing to detect and remove the SYNC, SOP, and EOP codes, and bit unstuffing. In addition the data handler circuit 10 generates various timing signals for controlling the data transfer.

Note that received data is output to the serial interface engine (SIE) which is a circuit (data processing means) in a stage after the data handler circuit 10, and data to be transmitted is input to the data handler circuit 10 from the SIE. This SIE includes SIE control logic for identifying the USB packet ID and address and end point logic for performing end-point processing such as identification of end point number and FIFO control.

The clock control circuit 12 receives various control signals from the SIE and performs processing such as control of the clock generation circuit 14.

The clock generation circuit 14 is a circuit that generates a 480-MHz clock used within the device and a 60-MHz clock used within the device and by the SIE, and it includes an oscillation circuit (OSC), a PLL 480M, and a PLL 60M.

In this case, the OSC generates a base clock in combination with other components such as an external oscillator, by way of example.

The PLL 480M is a phase-locked loop (PLL) that generates the 480-MHz clock necessary for HS mode as well as the 60-MHz clock necessary for FS mode, various components within the device, and the SIE, based on the base clock generated by the OSC.

The PLL 60M generates the 60-MHz clock necessary for FS mode, various components within the device, and the SIE, based on the base clock generated by the OSC.

The HS circuit 20 is a logic circuit for transferring data in HS mode, which has a data transfer speed of 480 Mbps, and an FS circuit 30 is a logic circuit for transferring data in FS mode, which has a data transfer speed of 12 Mbps.

The HS circuit 20 includes a sampling clock generation circuit 22 (high-speed delay line PLL: HSDLL) and an elasticity buffer 24.

In this case, the sampling clock generation circuit 22 is a circuit that generates a received-data sampling clock based on received data and a clock generated by the clock generation circuit 14.

The elasticity buffer 24 is a circuit for absorbing any difference in clock frequency (clock drift) between the interior of the device and an external device (an external device connected to the bus).

The analog front-end circuit 40 (transfer circuit) is an analog circuit including drivers and receivers for transfer in FS and HS modes. With USB, data is transferred by a differential signal, using data-plus (DP) and data-minus (DM) values.

With USB 2.0, an HS mode (broadly speaking: a first mode) and an FS mode (broadly speaking: a second mode) are defined as transfer modes. HS mode is a new transfer mode that has been defined by USB 2.0. FS mode is a transfer mode that was defined previously by the prior-art USB 1.1.

For that reason, the analog front-end circuit 40 of the integrated circuit device in accordance with this embodiment includes an HS-mode driver and receiver for transfer in HS mode and an FS-mode driver and receiver for transfer in FS mode.

More specifically, the analog front-end circuit 40 includes an FS driver 42, an FS differential receiver 44, a single-ended DP receiver 46, a single-ended DM receiver 48, an HS current driver 50 (transmission circuit), a low-speed squelch circuit 52 (detection circuit), a high-speed squelch circuit 54 (detection circuit), and an HS differential receiver 56 (reception circuit).

The FS driver 42 uses data terminals DP and DM in FS mode to output a differential signal formed from FS_DPout and FS_DMout from the FS circuit 30. The output of this FS driver 42 is controlled by FS_OutDis from the FS circuit 30.

The FS differential receiver 44 amplifies the differential signal that is input through DP and DM in FS mode, and outputs it as FS_DataIn to the FS circuit 30. The output of this FS differential receiver 44 is controlled by FS_CompEnb.

The single-ended DP receiver 46 amplifies the single-ended signal that is input through DP in FS mode, and outputs it as SE_DPin to the FS circuit 30.

The single-ended DM receiver 48 amplifies the single-ended signal that is input through DM in FS mode, and outputs it as SE_DMin to the FS circuit 30.

The HS current driver 50 (transmission circuit) amplifies a differential input signal formed from HS_DPout and HS_DMout from the HS circuit 20, and outputs it through DP and DM. In other words, the HS current driver 50 engenders a J state (DP is 400 mV and DM is 0 V) or K state (DP is 0 V and DM is 400 mV) by driving the DP or DM signal line at a fixed current value. The output of this HS current driver 50 is controlled by HS_OutDis from the HS circuit 20, and also controls the drive current by HS_CurrentSourceEnb.

The low-speed squelch circuit 52 (detection circuit: low-speed transmission envelope detector) detects a differential signal (whether or not data is present) that is input through DP and DM in FS mode and output as HS_SQ_L. In other words, it detects the difference between data and noise. The operation of this low-speed squelch circuit 52 is controlled by HS_SQ_L_Enb and the power conservation thereof is controlled by HS_SQ_L_Pwr.

The high-speed squelch circuit 54 (detection circuit: high-speed transmission envelope detector) detects a differential signal (whether or not data is present) that is input through DP and DM in HS mode, and outputs it as HS_SQ to the HS circuit 20. In other words, it detects the difference between data and noise. The operation of this high-speed HS_SQ squelch circuit 54 is controlled by HS_SQ_Enb and the power conservation thereof is controlled by HS_SQ_Pwr.

The HS differential receiver 56 (reception circuit) amplifies a differential signal that is input through DP and DM in HS mode, and outputs HS_DataIn and HS_DataIn_L. In other words, in HS mode it detects whether the DP and DM lines are in J state or K state. The amplification of this HS differential receiver 56 is controlled by HS_RxEnb.

The differential data terminal DP is connected to a power voltage of a higher potential (such as 3.3 V) by a switch element (transistor) SW1 and a pull-up resistor Rpu. The other differential data terminal DM is connected to a switch element SW2. These SW1 and SW2 are controlled by RpuEnb. In other words, the configuration is such that an HS device can be used as an FS device by making RpuEnb active to pull up DP through SW1 and Rpu.

Note that DM is connected to SW2 by a dummy resistor Rpu', to ensure that the load balance between DP and DM is maintained.

2. Macrocell Placement

Figure 3A:
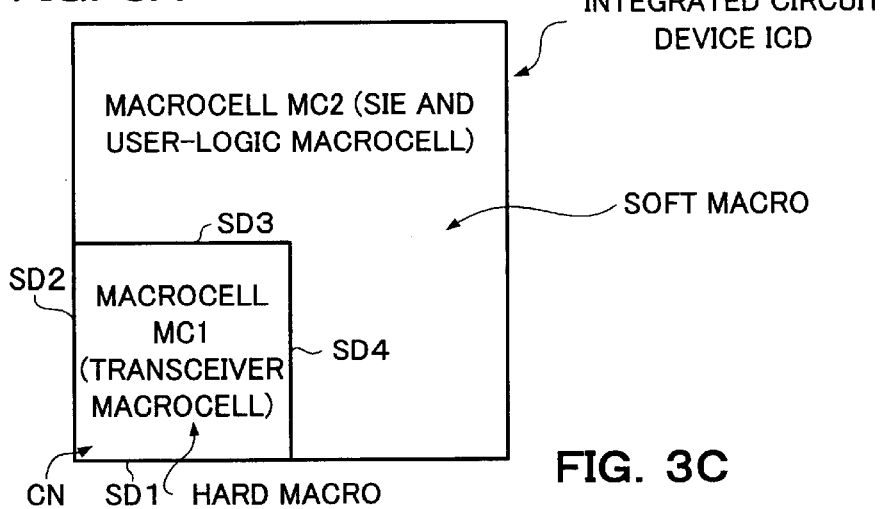
FIGS. 3A, 3B, 3C, and 3D show examples of the layout of the macrocells MC1 and MC2.

With this embodiment, the macrocell MC1 (first macrocell: transceiver macro) is placed in such a manner that a corner portion CN, which is a portion at which sides SD1 and SD2 (first and second sides) of MC1 intersect, coincides (or substantially coincides) with a corner portion of an integrated circuit device ICD (semiconductor chip), as shown in FIG. 3A. In addition, the macrocell MC2 (second macrocell: SIE and user-specified logic macrocell) is placed in a region that is not the region in which the macrocell MC1 is placed.

In this case, MC1 forms a hard macro in which the routing and circuit cell placement is fixed. More specifically, the routing and circuit cell placement is done manually (or part of the routing and placement may be done automatically), by way of example.

MC2, on the other hand, is a soft macro in which the routing and circuit cell placement is done automatically. More specifically, routing such as that between the basic cells may be done automatically by a gate array automatic placement/routing tool (part of the placement and routing could also be fixed), by way of example.

The macrocell MC1 includes components such as the analog front-end circuit 40 which is required to operate at high speed in response to tiny signals, the HS circuit 20 which is required to operates at 480 MHz, and the clock generation circuit 14 which is required to generate the 480-MHz clock, as shown in FIG. 2. If the placement and routing of this circuit of the macrocell MC1 were to be done by using a automatic placement/routing tool, therefore, it will not be possible to maintain the high levels of sophistication of the macrocell MC1. That is why it is desirable that the placement and routing of the circuit cells of the macrocell MC1 is done manually.

The macrocell MC2, on the other hand, does not include a physical-layer circuit (analog front-end circuit), so it is not required to operate at the high speeds required for the macrocell MC1. The circuit configuration of the macrocell MC2 will vary widely, depending on demands of the user of the integrated circuit device and of the application of electronic equipment that incorporates the integrated circuit device. It is therefore desirable to perform the placement and routing of the circuit cells of the macrocell MC2 by an automatic placement/routing tool.

With this embodiment, the corner portion CN of the macrocell MC1 is placed in such a manner that it is positioned at a corner portion of the integrated circuit device ICD. This facilitates handling, even if the configuration and scale of the circuit of the macrocell MC2 should change.

Figure 3B:
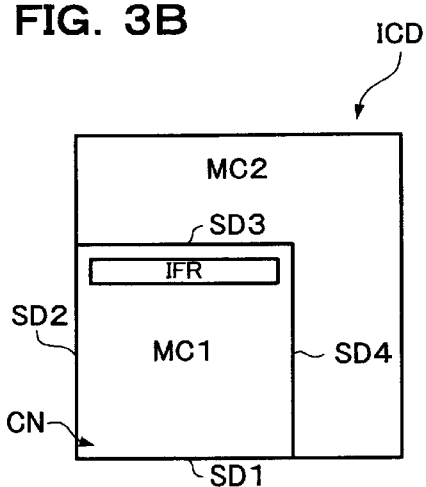
Figure 3C:
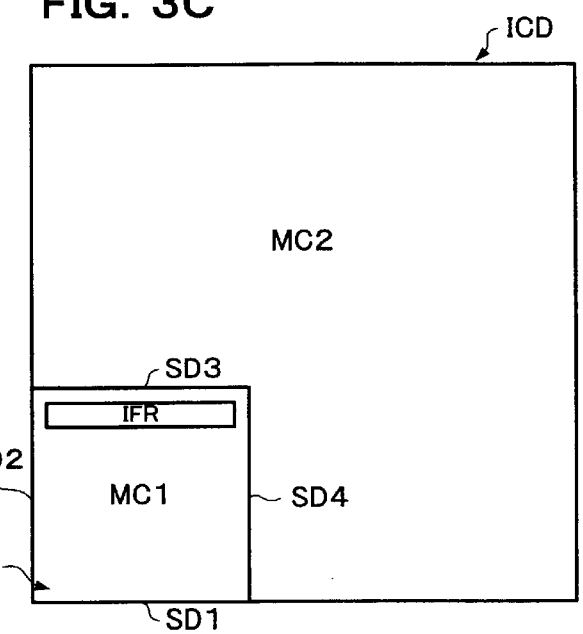

If the circuit of the macrocell MC2 should become smaller, by way of example, MC1 and MC2 may be placed as shown in FIG. 3B, whereas if the circuit of MC2 should become larger, MC1 and MC2 may be placed as shown in FIG. 3C.

In such a case, this embodiment ensures that the macrocell MC1 is placed at a corner of the integrated circuit device ICD, thus making it possible to substantially fix the placement and routing of the circuit cells within the core of the macrocell MC1 and the placements of the terminals (pads) within the I/O region, even if the configuration and scale of the circuit of the macrocell MC2 should change in accordance with user demands. It is therefore possible to maintain a high level of sophistication of the macrocell MC1 while remaining responsive to diverse user demands.

Since the macrocell MC1 is placed fixedly at the corner of the integrated circuit device ICD in accordance with this embodiment, it is possible to fixedly place an interface region IFR for exchanging data between the macrocells MC1 and MC2 (a region in which is placed a buffer for signal buffering) in a location on a side SD3 opposite to the side SD1 (or a side SD4 opposite to the side SD2), as shown in FIGS. 3B and 3C.

By fixedly placing the interface region IFR in this manner, delays in signals exchanged between the macrocells MC1 and MC2 and delivery timing will be within the permissible ranges, but it will become possible to ensure stable circuit operation even if the configuration and scale of the circuit of the macrocell MC2 should change.

In other words, fixing the location of the interface region IFR facilitates estimates of the parasitic capacitances in the signal lines between the macrocells MC1 and MC2. It is therefore possible to set the parasitic capacitances of these signal lines to fit into a permissible range, enabling automatic placement-routing of the macrocell MC2, which is a soft macro, and facilitating the design of signal timing.

Note that it is desirable to fixedly place the interface region (buffer region) on the macrocell MC2 side in a region adjacent to the interface region IFR on the macrocell MC1 side (a region along the side SD3), to further facilitate the design of signal timing.

Figure 3D:
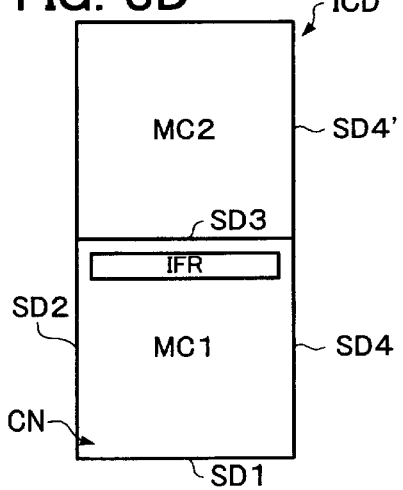

With this embodiment, the macrocells MC1 and MC2 could also be placed as shown in FIG. 3D. In other words, there is a region of the macrocell MC2 on the right-hand side (second direction side) of the edge SD4 (fourth side) of the macrocell MC1 in FIGS. 3A, 3B, and 3C, but not in FIG. 3D. This means that the side SD4 (fourth side) of the macrocell MC1 is positioned at a side SD4' (fourth side) of the macrocell MC2. The layout of FIG. 3D is valid when the size of the circuit of the macrocell MC1 is small or the number of terminals thereof is small.

3. Placement of Data, Terminal, and Clock Terminals

With this embodiment, the data terminals DP and DM (pads) are placed in an I/O region IOR1 (a first I/O region) along the side SD1 (the first side) of the macrocell MC1, and power terminals VDD and VSS and clock terminals XI and XO are placed in an I/O region IOR2 along the side SD2 (the second side).

In this case, DP and DM are data terminals that are connected to the USB bus. With USB, data is transmitted and received by using these differential data terminals DP and DM.

In addition VDD and VSS (PVDD, PVSS, XVDD, and XVSS) are power terminals for the circuit that generates the clocks for data transfer through DP and DM (such as the clock generation circuit 14 or sampling clock generation circuit 22 of FIG. 2, by way of example), and XI and XO are clock terminals. The clock generation circuit 14 and the sampling clock generation circuit 22 are powered by the power supply from these power terminals VDD and VSS. XI and XO are also input and output terminals for the oscillation circuit OSC of FIG. 2. Note that an external clock could also be input through XI.

If DP and DM are placed in IOR1 along the side SD1 and VDD, VSS, XI, and XO are placed in IOR2 along the side SD2 in this manner, data flowing along a direction DR1 (a first direction running from the side SD1 towards the opposite side SD3) can be sampled by using a clock that is input along a direction DR2 (a second direction running from the SD2 towards the opposite side SD4). The thus-sampled data can be output to the macrocell MC2 through the interface region IFR which is the region along the side SD3. This makes it possible to implement rational data transfer with no waste.

In particular, the sampling clock frequency in USB 2.0 HS mode is 480 MHz, which is extremely high. It is therefore desirable to sample the data received through DP and DM as soon as possible, to ensure that problems such as clock skew are not engendered.

Figure 4:
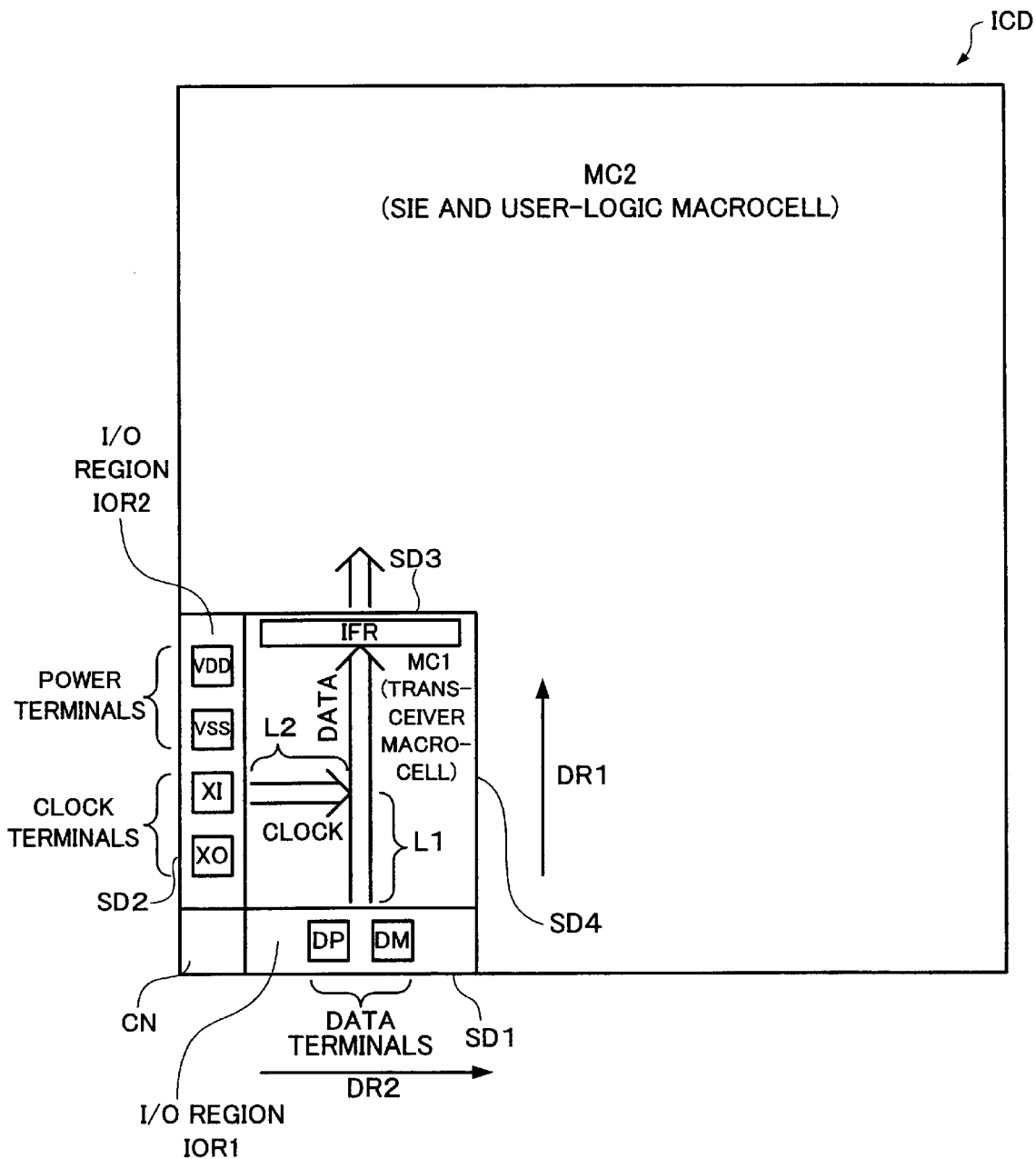
FIG. 4 shows an example of the layout of data terminals.

With this embodiment, the macrocell MC1 is placed at a corner of the integrated circuit device ICD, DP and DM are placed in IOR1 along the side SD1, and VDD, VSS, XI, and XO for sampling clock generation are placed in IOR2 along the side SD2, as shown in FIG. 4. It is therefore possible to make the distances L1 and L2 in FIG. 4, which give the distance to the location at which the data is sampled, as short as possible, thus enabling sampling of the data that is input through DP and DM at an early stage. This makes it possible to efficiently prevent the occurrences of reception errors, even during a high-frequency transfer mode such as USB 2.0 HS mode.

Note that the interface region IFR may be placed in the direction along the side SD4, but if the direction in which data flows is considered to be DR1, it is desirable to place IFR in the direction along the side SD3.

4. Placement of Clock Generation Circuit, etc

Figure 5:
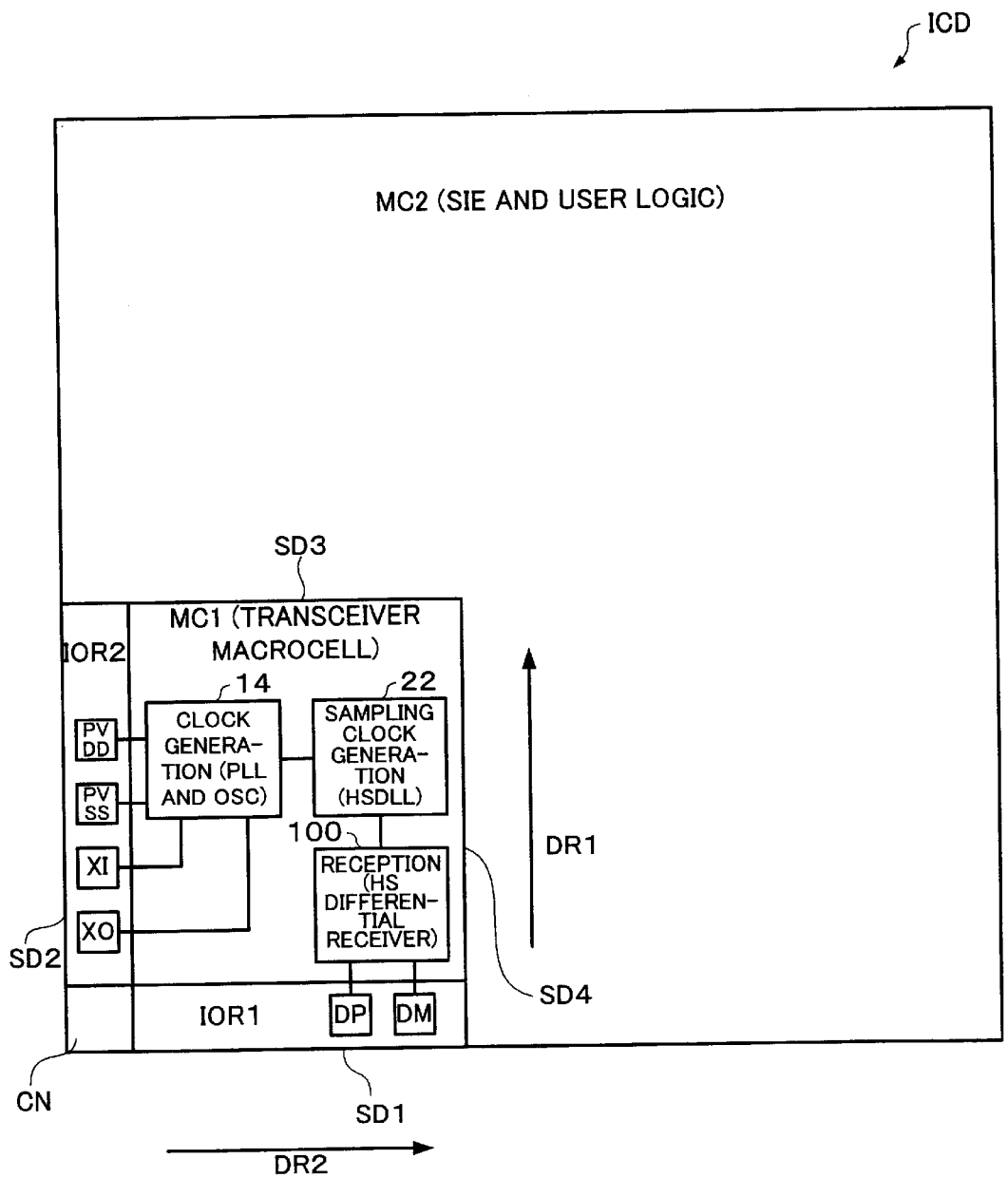
FIG. 5 shows an example of the layout of the clock generation circuit.

With this embodiment, a reception circuit 100 (the HS differential receiver 56 of FIG. 2) is placed on the DR1 side of the I/O region IOR1 (the first-direction side, from the side SD1 to the opposite side SD3), as shown in FIG. 5.

The clock generation circuit 14 of FIG. 2 is placed on the DR2 side of the I/O region IOR2 (the second-direction side, from the side SD2 to the opposite side SD4).

The sampling clock generation circuit 22 is placed on the DR2 side (right-hand side) of the clock generation circuit 14, on the DR1 side (upper side) of the reception circuit 100.

The layout of FIG. 5 makes it possible to reduce the distance between the reception circuit 100 and the sampling clock generation circuit 22. It is therefore possible to shorten the wiring linking the reception circuit 100 to the sampling clock generation circuit 22, making it possible to prevent unnecessary parasitic capacitances in the wiring of data received by the reception circuit 100 through DP and DM. As a result, it is possible to prevent the occurrence of edge-rounding (distortion) at rising or falling wavefronts of the data, and also convey data from the reception circuit 100 to the sampling clock generation circuit 22 with only a small signal delay.

A layout such as that shown in FIG. 5 also makes it possible to shorten the distance between the clock generation circuit 14 and the sampling clock generation circuit 22. It is therefore possible to shorten the wiring linking the clock generation circuit 14 to the sampling clock generation circuit 22, and prevent unnecessary parasitic capacitance in the wiring of the high-frequency (480 MHz) clocks (the first to Nth multi-phase clocks of the same frequency but mutually different phases. As a result, it is possible to prevent occurrences such as the generation of edge-rounding at rising or falling wavefronts of the clock signals or of a signal delay difference between the multi-phase clocks.

By shortening the distance between the reception circuit 100 and the sampling clock generation circuit 22 and the distance between the clock generation circuit 14 and the sampling clock generation circuit 22 in this way, it becomes possible to implement a circuit that can generate a high-frequency sampling clock such as that required for USB 2.0 HS mode, without using the latest semiconductor processes.

Figure 6:
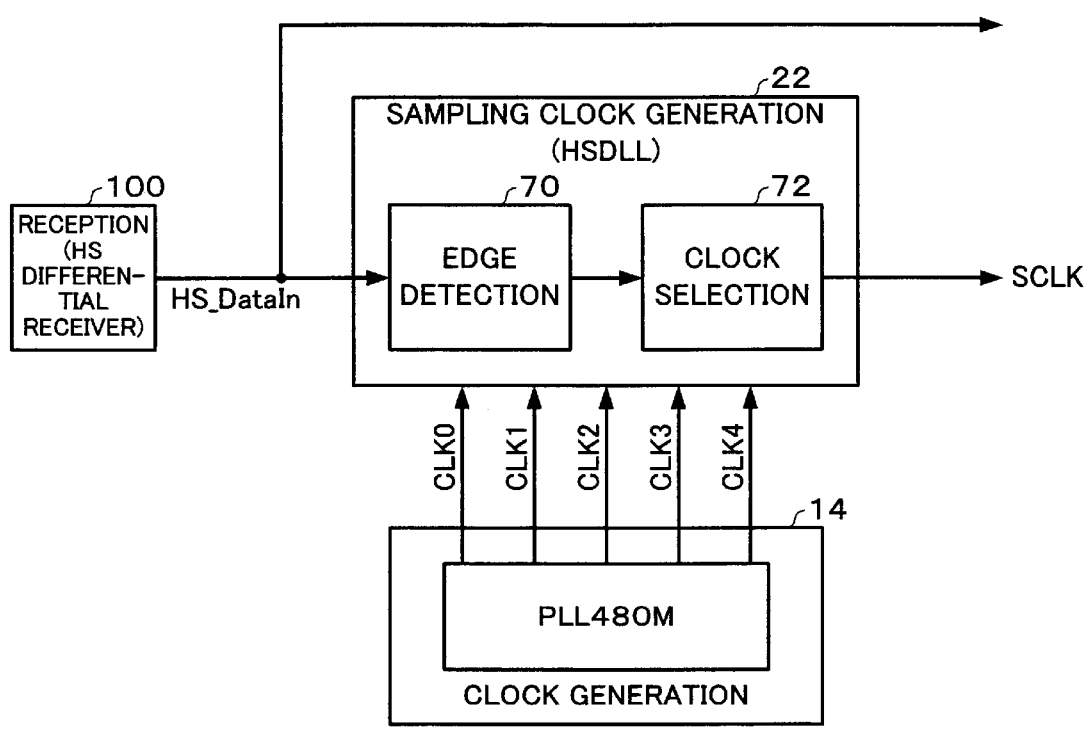
FIG. 6 shows an example of the configuration of the sampling clock generation circuit.

A configurational example of the sampling clock generation circuit 22 (HSDLL) of this embodiment is shown in FIG. 6

The PLL 480M included by the clock generation circuit 14 outputs clocks CLK0, CLK1, CLK2, CLK3, and CLK4 (broadly speaking: first to Nth clocks) that have the same frequency but mutually different phases. More specifically, the outputs of five differential output comparators (broadly speaking: first to Nth inversion circuits, in an odd number of stages) included by the VCO (an oscillation means with variably controlled oscillation frequency) are used as the clocks CLK0 to CLK4.

The sampling clock generation circuit 22 includes an edge detection circuit 70 and a clock selection circuit 72. This edge detection circuit 70 detects a data edge that is input from the reception circuit 100 (the HS differential receiver 56 of FIG. 2), and outputs that edge detection information to the clock selection circuit 72.

More specifically, it detects whether there is an edge of HS_DataIn between any of the edges (rising or falling edges) of CLK0 to CLK4 from the PLL 480M, and outputs that edge detection information to the clock selection circuit 72.

When that happens, the clock selection circuit 72 selects one of the clocks CLK0 to CLK4. based on this edge detection information, and outputs the thus-selected clock as a sampling clock SCLK to the elasticity buffer 24 in a later stage.

Timing waveform charts illustrating the operation of the sampling clock generation circuit 22 are shown in FIGS. 7A and 7B.

As shown in FIGS. 7A and 7B, CLK0 to CLK4 are clocks of the same 480-MHz frequency. If the period of each clock is T, the phase between each pair of clocks is shifted by just T/5 (broadly speaking: T/N).

In FIG. 7A, an edge ED of HS_DataIn (receive data) that is being sampled is detected by the edge detection circuit 70 of FIG. 6 between the clocks CLK0 and CLK1. If that happens, the clock CLK3, which has an edge EC3 that is shifted by just three (broadly speaking: a set number M) edges from the edge ED of HS_DataIn, is selected by the clock selection circuit 72 of FIG. 12, and the thus-selected CLK3 is output to the later-stage circuit (the elasticity buffer 24) as the HS_DataIn sampling clock SCLK.

In FIG. 7B, on the other hand, the edge ED of HS_DataIn is detected by the edge detection circuit 70 between CLK2 and CLK3. If that happens, the clock CLK0 having an edge EC0 that is shifted by just three (broadly speaking: the set number M) edges from the edge ED of HS_DataIn is selected by the clock selection circuit 72, by way of example, and the thus-selected CLK0 is output to the later-stage circuit (the elasticity buffer 24) as the HS_DataIn sampling clock SCLK.

The thus-configured sampling clock generation circuit 22 of this embodiment makes it possible to detect the edge ED of HS_DataIn and generate the sampling clock SCLK for the HS_DataIn by selecting from CLK0 to CLK4, based on the thus-obtained edge detection information. It is therefore possible to generate a clock SCLK that is suitable for sampling this HS_DataIn, even when HS_DataIn is fast transfer data that is synchronized with the 480 MHz of an external device, such as in HS mode of USB 2.0.

This embodiment of the present invention makes it possible to position an edge ES of the generated sampling clock SCLK close to the direct center of the edges of HS_DataIn, as shown in FIGS. 7A and 7B. Since this makes it possible to ensure sufficient set-up and hold times for holding data in the later-stage circuit (the elasticity buffer 24), it becomes possible to greatly increase the reliability of data reception.

In addition, this embodiment of the present invention efficiently utilizes the outputs of the differential output comparators (inversion circuits) within the VCO of the PLL 480M as the five-phase (multi-phase) clocks CLK0 to CLK4 used for detecting HS_DataIn edges and generating SCLK. It is therefore unnecessary to provide separate a new circuit for generating CLK0 to CLK4, enabling a reduction in the size of the circuit.

Figure 8:
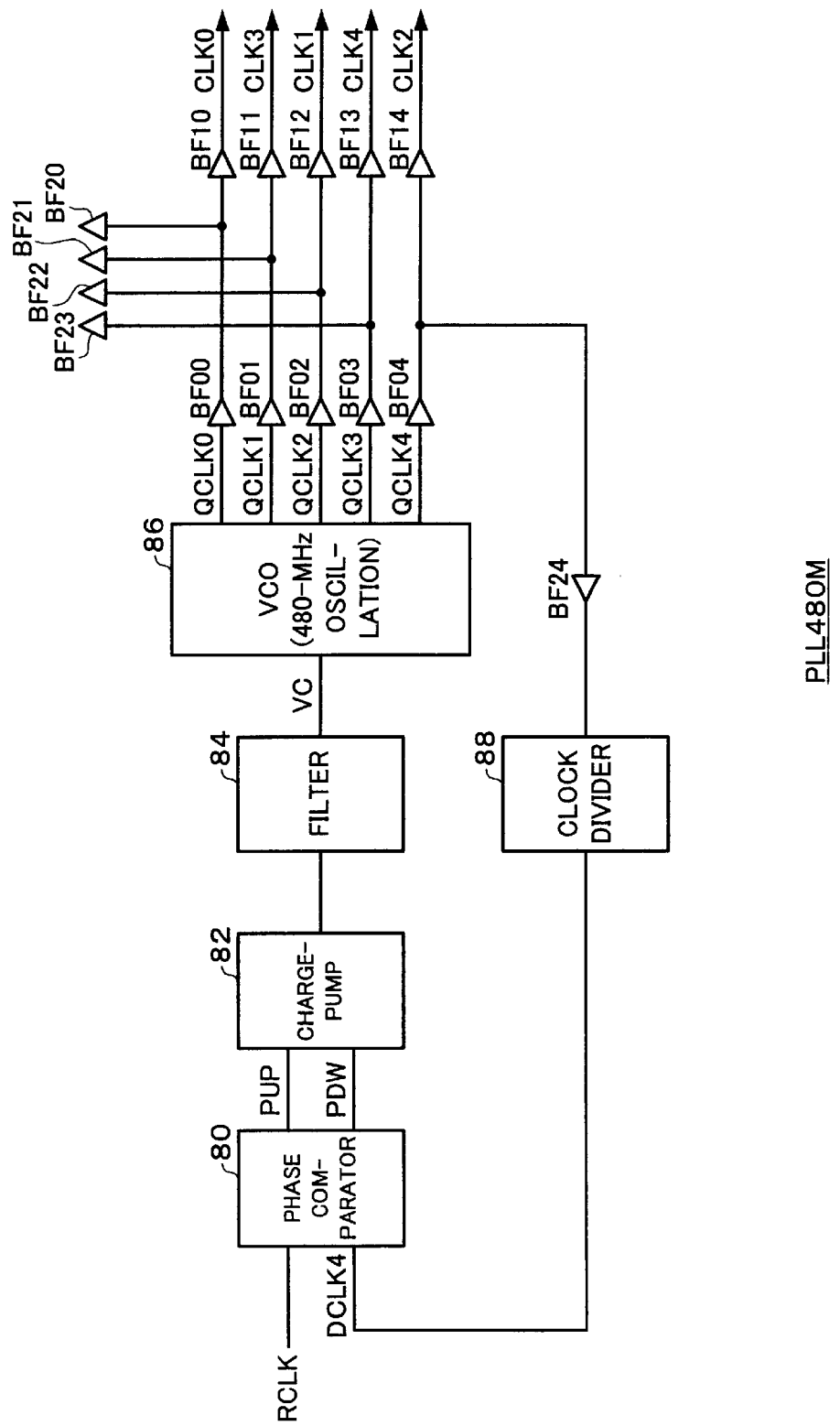
FIG. 8 shows an example of the configuration of the PLL 480M.

A detailed example of the configuration of the PLL 480M included within the clock generation circuit 14 is shown in FIG. 8.

This PLL 480M includes a phase comparator 80, a charge pump circuit 82, a filter circuit 84, a voltage-controlled oscillator (VCO) 86, and a clock divider 88.

In this case, the phase comparator 80 compares the phases of a base clock RCLK (of, for example, 12 to 24 MHz) and a clock DCLK4 from the clock divider 88, then outputs a phase error signal PUP or PDW (where PUP is a phase-advanced signal and PDW is a phase-retarded signal).

The charge pump circuit 82 operates as a charge pump on the basis of the PUP or PDW signal from the phase comparator 80. More specifically, if PUP is active, the charge pump circuit 82 charges a capacitor within the filter circuit 84; if PDW is active, it discharges the capacitor. A control voltage VC that has been smoothed by the filter circuit 84 is given to the VCO 86.

The VCO 86 performs an oscillation operation wherein the oscillation frequency is controlled in a variable manner in accordance with the control voltage VC, to generate 480-MHz clocks QCLK0 to QCLK4. If the control voltage VC is high, by way of example, the oscillation frequency also increases; if the control voltage VC is low, the oscillation frequency also decreases.

The clocks QCLK0, QCLK1, QCLK2, QCLK3, and QCLK4 generated by the VCO 86 are output to the exterior as CLK0, CLK3, CLK1, CLK4, and CLK2 through buffers BF00 to BF04 and BF10 to BF14. Note that BF20 to BF23 denote dummy buffer circuits for load-combining with another buffer circuit BF24.

The clock divider 88 takes the clock QCLK4 that is input from the VCO 86 through the buffer circuits BF04 and BF24, divides it (1/N), and outputs the result of the division as the clock DCLK4 to the phase comparator 80.

Use of the PLL 480M configured as shown in FIG. 8 makes it possible to generate high-frequency 480-MHz clocks CLK0 to CLK4 that are phase-synchronized with the base clock RCLK (the clock generated by the oscillation circuit OSC).

The above-described sampling clock generation circuit 22 of FIG. 6 generates the sampling clock SCLK, based on edge information of HS_DataIn from the reception circuit 100 (differential receiver 56) and the multi-phase 480-MHz clocks CLK0 to CLK4 from the clock generation circuit 14 (the PLL 480M). If unnecessary capacitances should occur in the wiring of HS_DataIn and the clocks CLK0 to CLK4, it may become impossible to generate a suitable sampling clock.

With this embodiment, the macrocell MCI is placed at a corner of the integrated circuit device ICD, and the reception circuit 100, the clock generation circuit 14, and the sampling clock generation circuit 22 are placed as shown in FIG. 5. It is therefore possible to reduce the length of wiring between the reception circuit 100 and the sampling clock generation circuit 22 and the length of wiring between the clock generation circuit 14 and the sampling clock generation circuit 22 as far as possible. As a result, it becomes possible to generate a suitable sampling clock even when employing the sampling clock generation circuit 22 of the configuration shown in FIG. 6.

5. Placement of Capacitor Region

Figure 9:
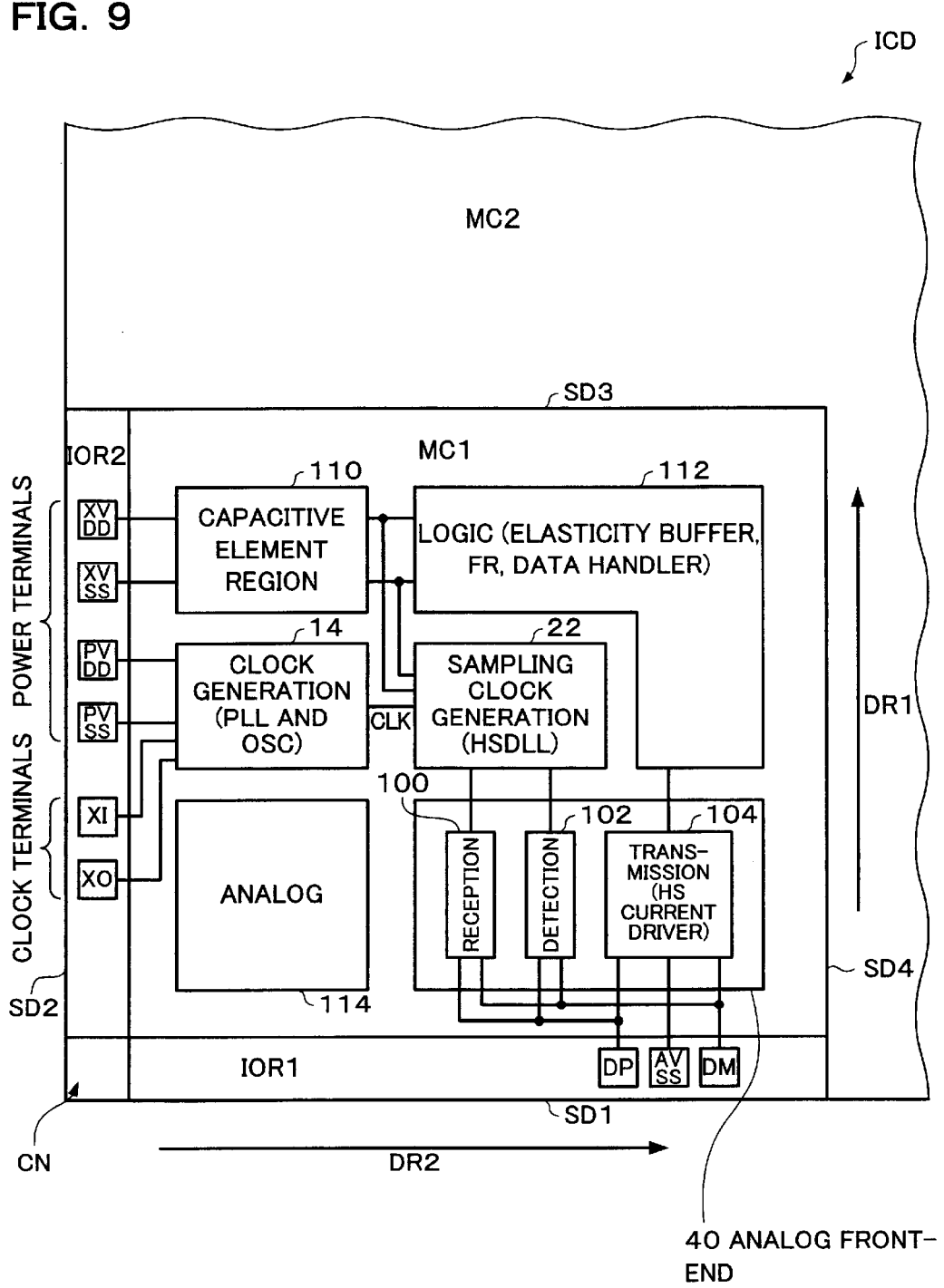
FIG. 9 shows an example of the layout of the capacitive element region, reception circuit, detection circuit, and transmission circuit.

As shown in FIG. 9, the power terminals PVDD and PVSS (first power terminals) for supplying power to the clock generation circuit 14 and the power terminals XVDD and XVSS (second power terminals) for supplying power to the sampling clock generation circuit 22 and another logic circuit 112 (the elasticity buffer 24, the FS circuit 30, and the data handler circuit 10 of FIG. 2) are placed in the I/O region IOR2 along the side SD2.

With this embodiment, the clock generation circuit 14 is placed adjacent to power terminals PVDD and PVSS in the direction DR2 (second direction).

Figure 10:
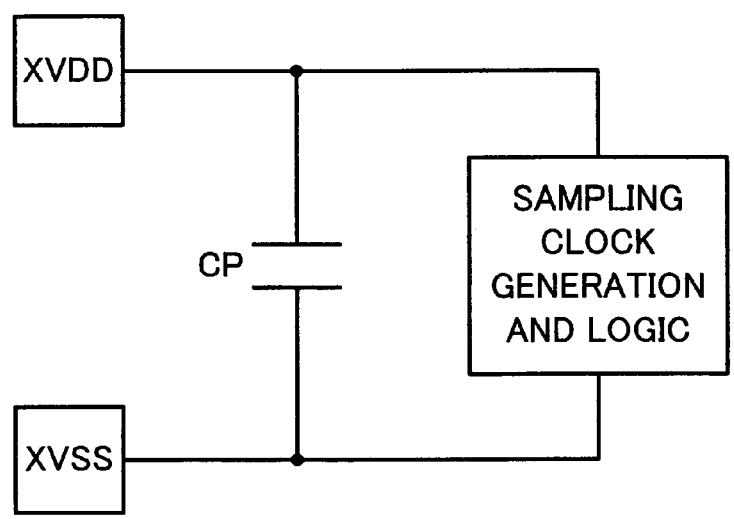
FIG. 10 is illustrative of the capacitive element CP.

A capacitive element region 110 for ensuring stabilized variations in the voltages of the power terminals XVDD and XVSS is placed adjacent to the power terminals XVDD and XVSS in the direction DR2. In this case, a capacitive element CP is an element with one end (positive-polarity side) connected to XVDD and the other end (negative-polarity side) connected to XVSS, as shown in FIG. 10, utilizing a guard ring (ring-shaped power source) for stabilizing the substrate potential.

If the clock generation circuit 14 is placed adjacent to the power terminals PVDD and PVSS as shown in FIG. 9, it becomes possible to shorten the lengths of power source wiring between PVDD/PVSS and the clock generation circuit 14. It is therefore possible to suppress the voltage drop due to current flowing in the clock generation circuit 14 to a minimum, ensuring stable operation of the clock generation circuit 14.

The PLL 480M within the clock generation circuit 14 (see FIG. 8) in particular requires the generation of a high-frequency (480-MHz clock, so the current consumption therefor is extremely high. If this current consumption causes a large voltage drop in the power source, the gain in the inversion circuit within the PLL 480M will drop and thus it will become impossible to ensure the 480-MHz oscillation.

If the clock generation circuit 14 is placed adjacent to the power terminals PVDD and PVSS, as in this embodiment, it is possible to prevent such a situation efficiently.

If the capacitive element region 110 is placed adjacent to the power terminals XVDD and XVSS as shown in FIG. 9, changes in the voltages of XVDD and XVSS can be efficiently stabilized at a location close to XVDD and XVSS.

In particular, the elasticity buffer included by the sampling clock generation circuit 22 and the logic circuit 112 operate at a high frequency (480 MHz). There is therefore a danger that misoperation of the sampling clock generation circuit 22 or the elasticity buffer may be caused by variations in the power voltage due to charging or discharging of the gate capacitance of a MOS transistor thereof.

If the capacitive element region 110 is placed directly close to the power terminals XVDD and XVSS, as in this embodiment, it becomes possible to efficiently prevent such a situation. This also has the effect of enabling efficient utilization of dead space (empty area) on the DR1 side (upper side) of the clock generation circuit 14.

Note that an analog circuit 114 in FIG. 9 is for generating a reference voltage and a reference current. The oscillation circuit OSC of the clock generation circuit 14 may be placed adjacent to the region in which the analog circuit 114 is placed, by way of example.

6. Placement Relationship of Reception Circuit and Detection Circuit

As shown in FIG. 9, the analog front-end circuit 40 of this embodiment includes a detection circuit 102 (the high-speed squelch circuit 54 of FIG. 2: envelope detector) for distinguishing whether a signal on the bus is valid data or noise.

This detection circuit 102 holds the peak value of the signal on the bus and detects the amplitude of the bus signal by detecting the surrounding connecting lines of the signal. It determines that the signal is noise if the amplitude thereof is less than a value such as 100 mV, or valid data if it is greater than 100 mV. If it has determined that the signal is valid data, the detection circuit 102 makes the detection signal HS_SQ of FIG. 11A go high (active). This makes an AND circuit 103 conductive so that the received data from e reception circuit 100 is transferred to the sampling clock generation circuit 22.

Under USB 2.0, it has been established that the signal detection operation of this detection circuit 102 must be performed at an extremely high speed.

Figure 11A:
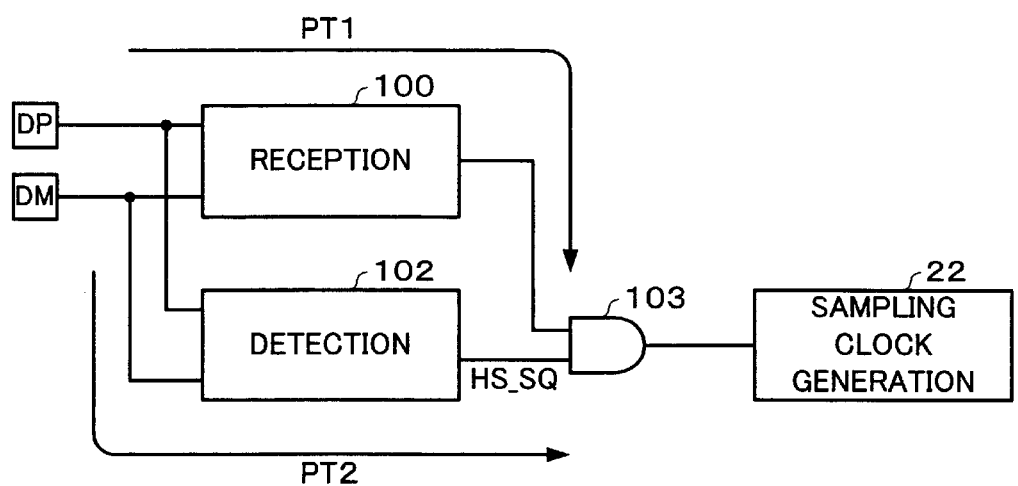
FIGS. 11A and 11B are illustrative of the operation of the detection circuit (squelch circuit)
Figure 11B:
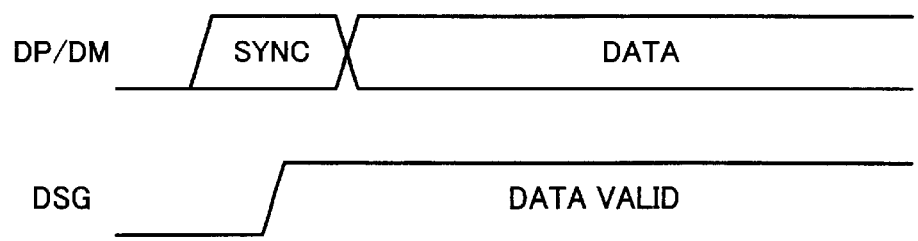

In other words, the SYNC bit of FIG. 11B is stripped off in every passage through the hub device under USB 2.0. For that reason, it is possible that the number of SYNC bits is extremely low by the time that the end device has received the data. If the signal detection operation of the detection circuit 102 is slow, therefore, the timing at which HS_SQ goes high will be delayed and there is a danger that received data will be lost.

With this embodiment, the reception circuit 100 and the detection circuit 102 (squelch circuit) are placed adjacent to one another in the direction DR2 from the side SD2 towards the side SD4 of the macrocell MC1, as shown in FIG. 9.

This makes it possible to equalize parasitic capacitances and resistances in paths PT1 and PT2 of FIG. 11A. If the signal on the bus is detected to be noise, therefore, it is possible to prevent the transfer of erroneous data to the sampling clock generation circuit 22 through the path PT1 and the AND circuit 103, by immediately making the output HS_SQ of the detection circuit 102 go low. If the signal on the bus is detected to be valid data, on the other hand, data received by the reception circuit 100 can be transferred immediately to the sampling clock generation circuit 22 through the path PT1 and the AND circuit 103, by making the output HS_SQ of the detection circuit 102 go high. The thus-configured embodiment succeeds in implementing stabilized circuit operation by equalizing the parasitic capacitances and resistances in the wiring of the paths PT1 and PT2.

Figure 12:
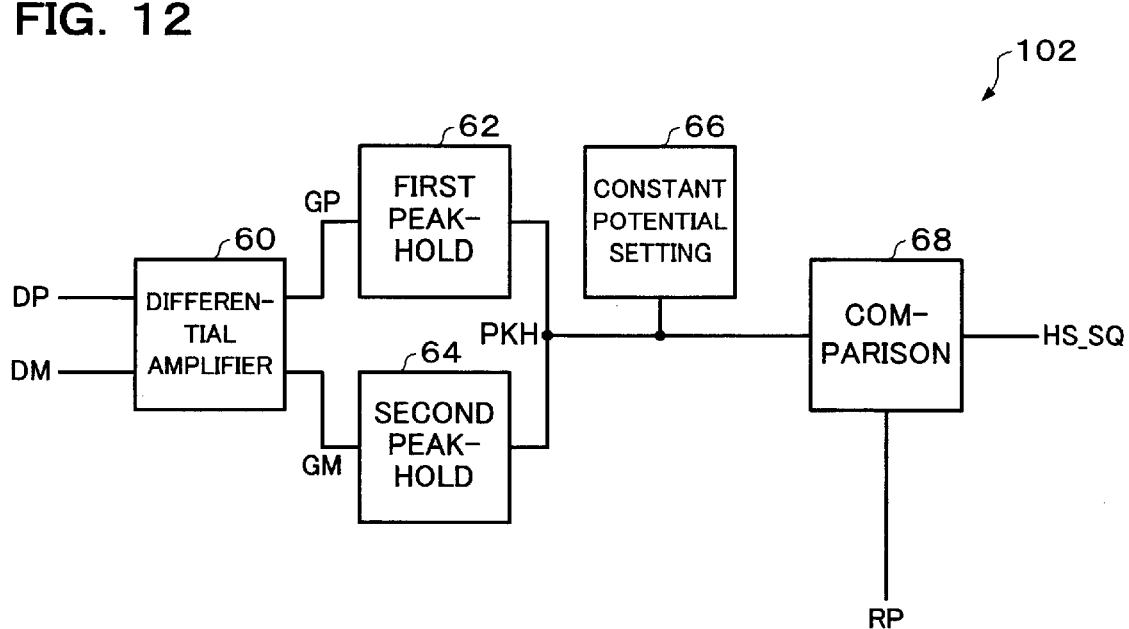
FIG. 12 shows an example of the configuration of the detection circuit.

An example of the configuration of the detection circuit 102 (squelch circuit) is shown in FIG. 12.

The detection circuit 102 of FIG. 12 includes a differential amplifier circuit 60, first and second peak-hold circuits 62 and 64, a constant potential setting circuit 66, and a comparison circuit 68.

The differential amplifier circuit 60 amplifies a voltage that is the difference between the differential input signal from DP and DM, and generates differential output signals GP and GM.

The first peak-hold circuit 62 detects the peak value of one output signal GP of the differential output signals, and holds it at a node PKH.

The second peak-hold circuit 64 detects the peak value of the other output signal GM of the differential output signals, and holds it at the node PKH.

The constant potential setting circuit 66 returns the potential of the node PKH to a fixed state in correspondence with a non-detection state of the signal, using a time constant that changes more slowly than changes in the potential of the node PKH.

The comparison circuit 68 compares a reference potential RP and the potential of the node PKH and outputs the result as HS_SQ.

The thus-configured detection circuit 102 of FIG. 12 holds in the node PKH a peak value of the differential output signals GP and GM obtained from DP and DM, and that PKH potential slowly returns to the constant potential linked to the signal non-detection state, using that time constant. It is therefore possible to determine the presence of received data accurately, even when the DP and DM differential input signals are of tiny amplitude and change rapidly, by comparing the potential of the node PKH with the reference level potential RP.

7. Placement Relationship of Reception Circuit and Transmission Circuit

With this embodiment, a transmission circuit 104 (the HS current driver 50 of FIG. 2) is placed on the DR2 side (the second-direction side, from SD2 towards SD4, or the right-hand side) of the reception circuit 100 (the HS differential receiver 56).

Figure 13A:
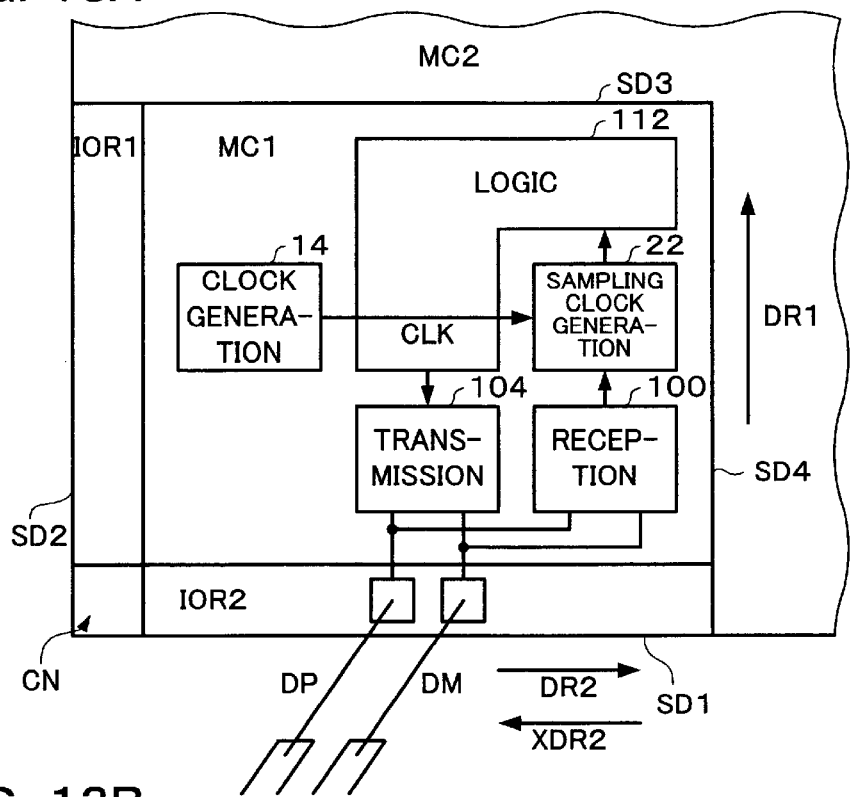
FIGS. 13A and 13B are illustrative of the placement relationship of the transmission circuit and the reception circuit.

Another method of placement may be considered as a layout method in accordance with a comparative example of this embodiment, as shown by way of example in FIG. 13A, wherein the transmission circuit 104 is placed on a direction XDR2 side (the side opposite to DR2, or the left-hand side) of the reception circuit 100.

With this method, however, the wiring region for clocks from the clock generation circuit 14 tends to overlap the region for the logic circuit 112 that supplies transmission data to the transmission circuit 104, as shown in FIG. 13A. This raises a problem concerning a deterioration in layout efficiency.

When the sampling clock is generated by the method of FIGS. 6, 7A, and 7B, in particular, it is preferable that the parasitic capacitances and resistances in the wiring of the clocks (multi-phase clocks) from the clock generation circuit 14 should be kept as small as possible. With the layout method of FIG. 13A, however, the distance between the clock generation circuit 14 and the sampling clock generation circuit 22 is large, leading to the addition of wasteful parasitic capacitances and resistances into the wiring from the clock generation circuit 14.

In addition, the layout method of FIG. 13A also positions the data terminals DP and DM, which are placed on the lower side of the transmission circuit 104, in a location close to the corner portion CN. This forces the bonding wires for the data terminals DP and DM to be formed at a slant, engendering a difference in the lengths of the bonding wires for DP and DM. As a result, there will be a difference in parasitic inductances between the DP and DM bonding wires which will damage the load balance between DP and DM, which may reduce the capabilities of the transmission circuit 104.

Figure 13B:
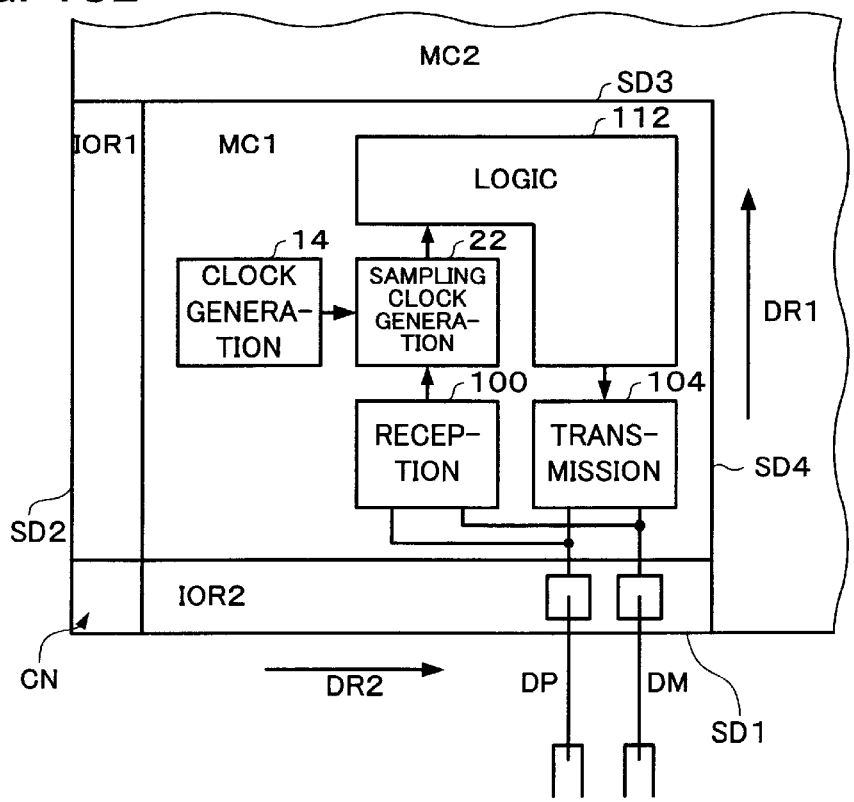

In contrast thereto, if the transmission circuit 104 is placed on the DR2 side (right-hand side) of the reception circuit 100, as shown in FIG. 13B, the reception circuit 100 can be located at a position closer to the corner portion CN. As a result, it is possible to prevent a situation in which the wiring region for the clocks from the clock generation circuit 14 overlaps the region for the logic circuit 112, thus enabling an increase in layout efficiency.

If the layout method of FIG. 13B is used, the distance between the clock generation circuit 14 and the sampling clock generation circuit 22 can be reduced and also the parasitic capacitances and resistances of the clock wiring from the clock generation circuit 14 can be suppressed to a minimum.

In addition, the layout method of FIG. 13B makes it possible to locate the data terminals DP and DM far from the corner portion CN. This makes it possible to make the bonding wires for the data terminals DP and DM completely straight, enabling suppression of any differences in the lengths of the bonding wires for the data terminals DP and DM to a minimum. As a result, the difference in parasitic inductance between the bonding wires for DP and DM can be suppressed to a minimum, the load balance of DP and DM can be equalized, and thus it becomes possible to implement the transmission circuit 104 with a high level of sophistication.

8. Placement Relationship of Transmission Circuit and Data Terminals

Figure 14A:
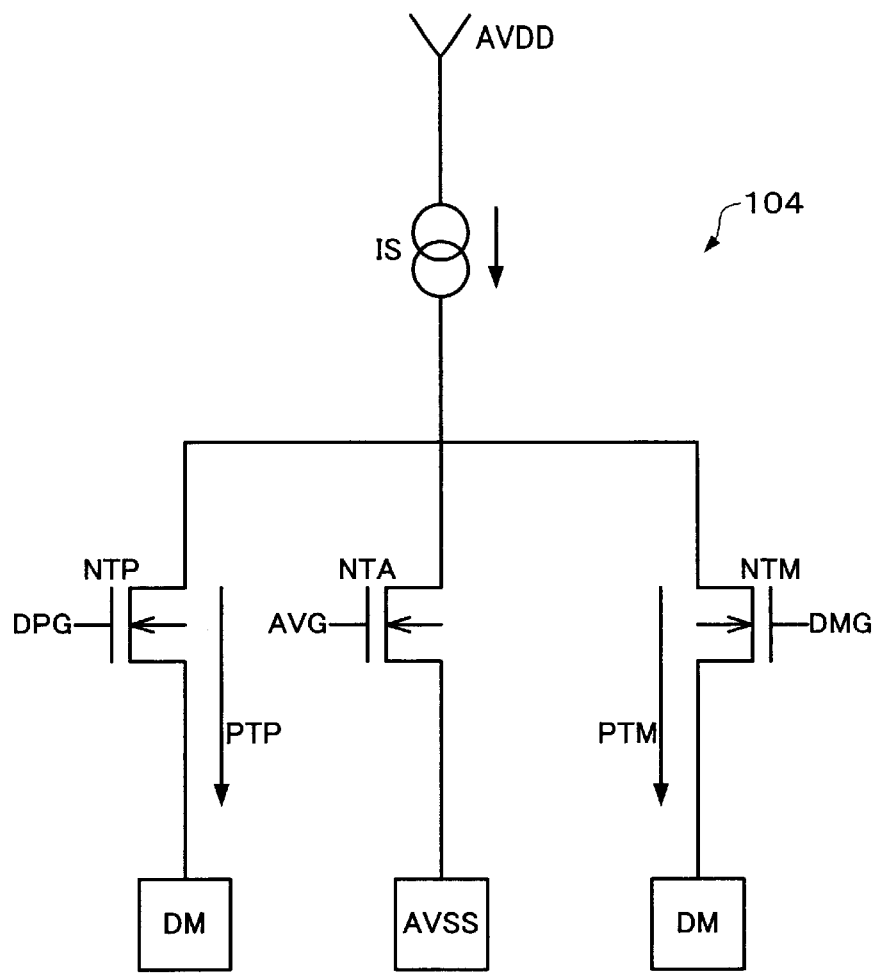
FIGS. 14A and 14B are illustrative of the current drivers of the transmission circuit.
Figure 14B:
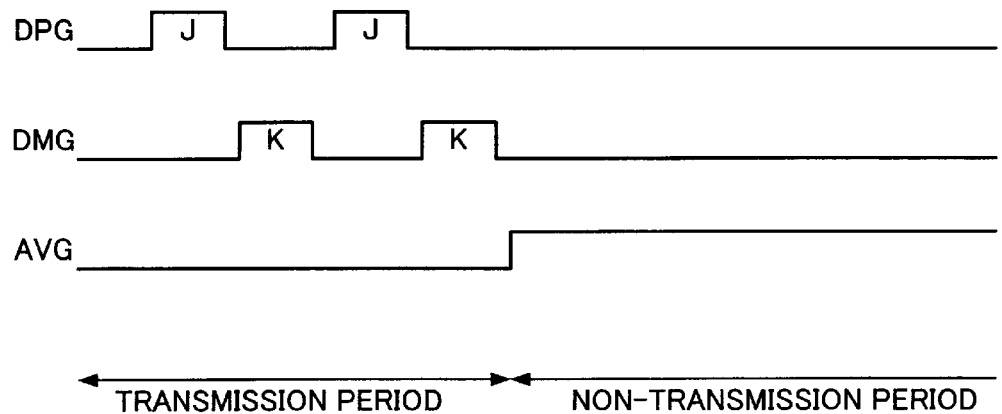

The transmission circuit 104 of this embodiment includes a fixed-current source IS (a p-type transistor having a gate electrode that has been set to a constant potential) and current drivers configured of n-type transistors (switch elements) NTP, NTA, and NTM. In this case, the gate electrodes of the n-type transistors NTP, NTA, and NTM are controlled by DPG, AVG, and DMG. A fixed current is made to flow from the fixed-current source IS, through the n-type transistor NTP, and into DP, to set the bus state to the J state, by setting DPG high (active) as shown in FIG. 14B. A fixed current is made to flow from the fixed-current source IS, through the n-type transistor NTM, and into DM, to set the bus state to the K state, by setting DMG high. Transmission in HS mode is enabled by setting the bus to either the J state or the K state in accordance with the transmitted data.

In periods outside the transmission (HS transmission) period, on the other hand, a fixed current is made to flow from the fixed-current source IS, through the n-type transistor NTA, and into AVSS (breaking the fixed current from IS), by setting AVG high as shown in FIG. 14B. Even in this period outside the transmission period, the fixed current of the fixed-current source IS continues to flow to AVSS through the n-type transistor NTA, ensuring that a stabilized fixed current can be made to flow through NTP or NTM to DP or DM as soon as transmission starts, thus enabling an increase in the response of the transmission circuit 104.

If the transmission circuit 104 is to be used as a current driver in such a case, it is desirable to adjust parasitic resistances, capacitances, and inductances in the paths PTP and PTM, to maintain the load balance between DP and DM.

With this embodiment, the transmission circuit 104 and the data terminals DP and DM are placed adjacent to each other in the direction DR1 (the direction from SD1 to SD3, or the upward direction).

Figure 15:
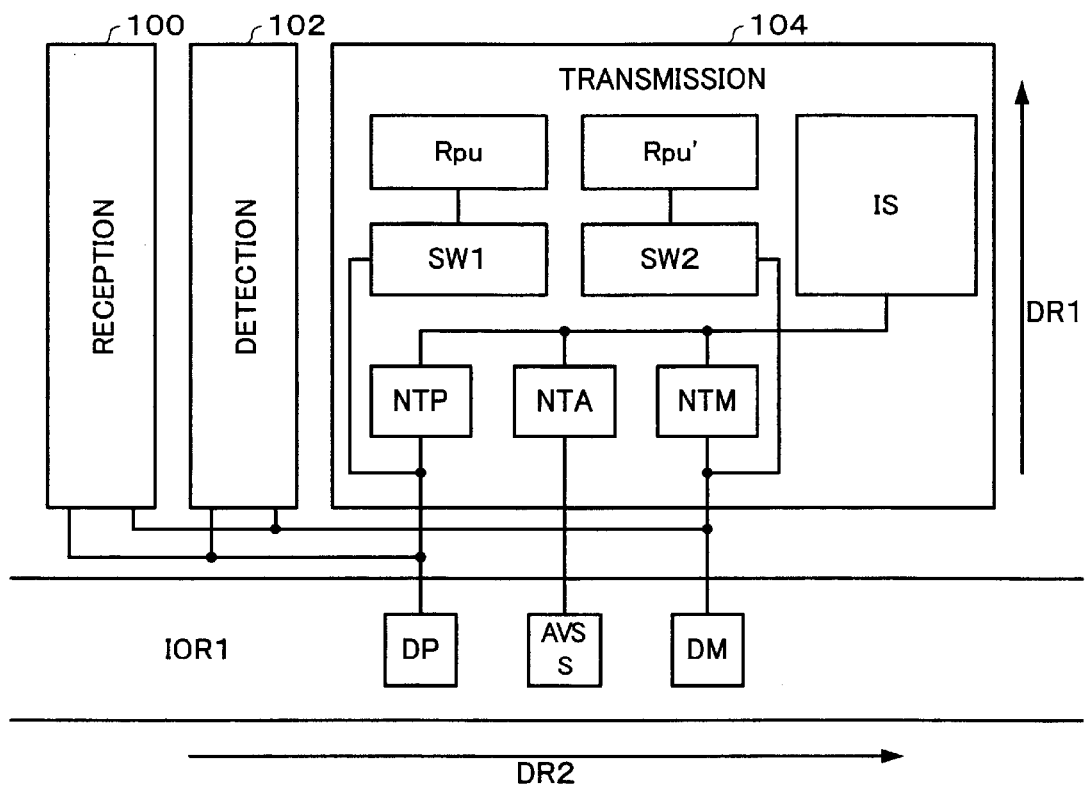
FIG. 15 shows an example of the layout of the terminals DP, AVSS, and DM, and the n-type transistors NTP, NTA, and NTM.

More specifically, the n-type transistors NTP and NTM of the transmission circuit 104 (the current driver of FIG. 14A) are placed directly above (in the direction DR1) the data terminals DP and DM, as shown in FIG. 15. The power terminal AVSS, through which flows the fixed current from the fixed-current source IS during periods other than the transmission period, is placed in a region between the data terminals DP and DM, and the n-type transistor NTA is placed directly above (in the direction DR1) the AVSS.

This placement makes it easy to adjust the parasitic resistances, capacitances, and inductances in the wiring between DP and NTP and in the wiring between DM and NTM, thus maintaining the load balance between DP and DM. This makes it possible to increase the capabilities of the transmission circuit 104.

A particular feature of this embodiment is the placement of the transmission circuit 104 on the DR2 side (the right-hand side) of the reception circuit 100, as described with reference to FIG. 13B. In addition, the transmission circuit 104 is placed adjacent to the DR1 side (upper side) of the data terminals DP and DM, as described with reference to FIG. 15. As a result, the position of the data terminals DP and DM is separated from the corner portion CN, making it possible to reduce the parasitic inductance in the bonding wires of DP and DM, as described with reference to FIG. 13B. This makes it possible to further maintain the load balance of DP and DM.

Note that the resistors Rpu, Rpu' and switch elements SW1 and SW2 of FIG. 2 are placed on the DR1 side (upper side) of NTP, NTA, and NTM in FIG. 15. In other words, the layout of NTP, SW1, and Rpu is symmetrical with respect to the layout of NTM, SW2, and Rpu'. This makes it possible to balance the parasitic resistances, capacitances, and inductances for DP and DM. Note also that the fixed-current source IS in FIG. 15 may be placed on the DR1 side (upper side) or NTP, NTA, and NTM or on the DR1 side of Rpu and Rpu'.

9. Electronic Equipment

The description now turns to examples of electronic equipment including the integrated circuit device (data transfer control device) of this embodiment of the invention.

Figure 16A:
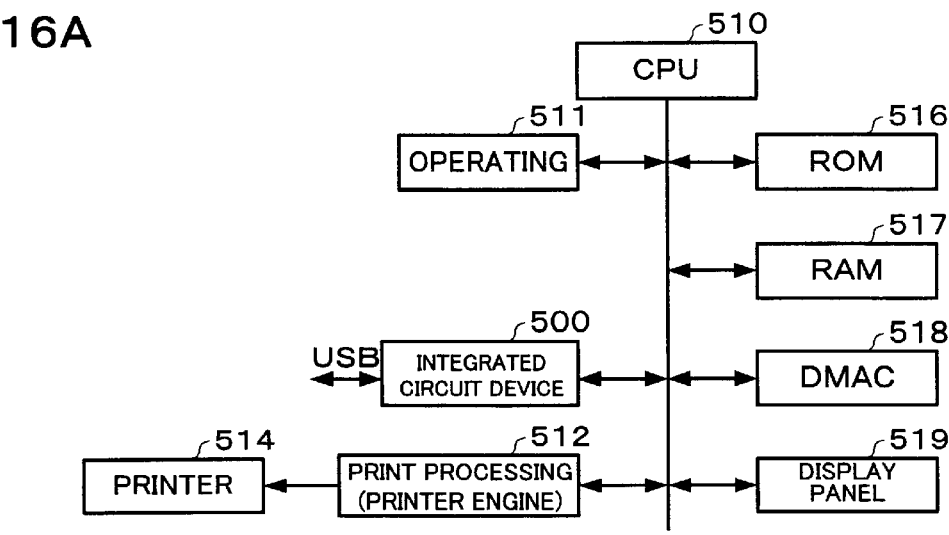
FIGS. 16A, 16B, and 16C are internal block diagrams of various items of electronic equipment.
Figure 17A:
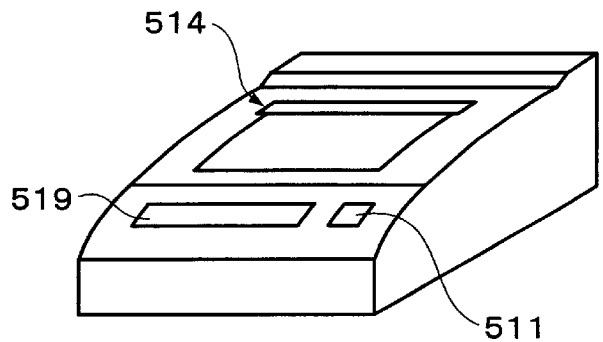
FIGS. 17A, 17B, and 17C show typical external views of various items of electronic equipment.

An internal block diagram of a printer that is one example of such electronic equipment is shown in FIG. 16A with an external view thereof being shown in FIG. 17A. A CPU (microcomputer) 510 has various functions, including that of controlling the entire system. An operating section 511 is designed to enable the user to operate the printer. Data such as a control program and fonts is stored in a ROM 516, and a RAM 517 functions as a work area for the CPU 510. A DMAC 518 is a DMA controller for transferring data through the CPU 510. A display panel 519 is designed to inform the user of the operational state of the printer.

Serial print data that has been send in from another device such as a personal computer via USB is converted into parallel print data by an integrated circuit device 500. The thus converted parallel print data is sent to a print processing section (a printer engine) 512 by the CPU 510 or the DMAC 518. This parallel print data is subjected to given processing in the print processing section 512 and is output for printing to paper by a print section (a device for outputting data) 514 including components such as a print head.

Figure 16B:
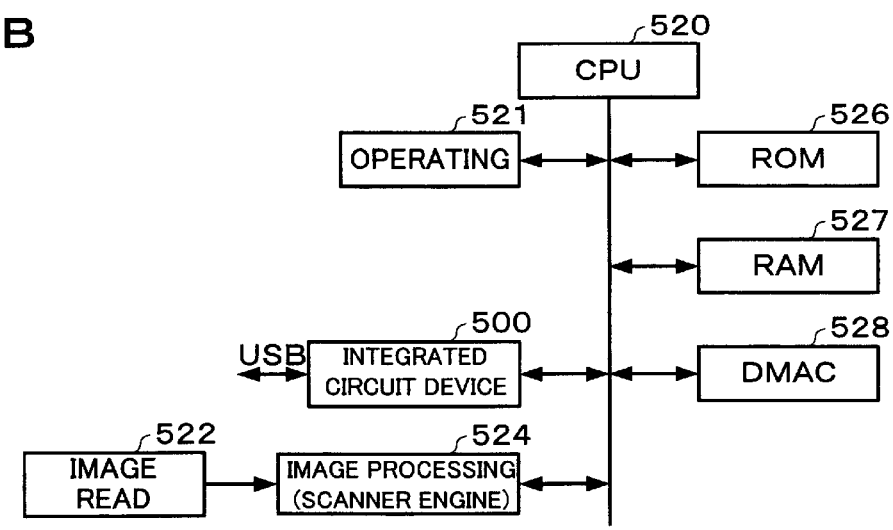
Figure 17B:
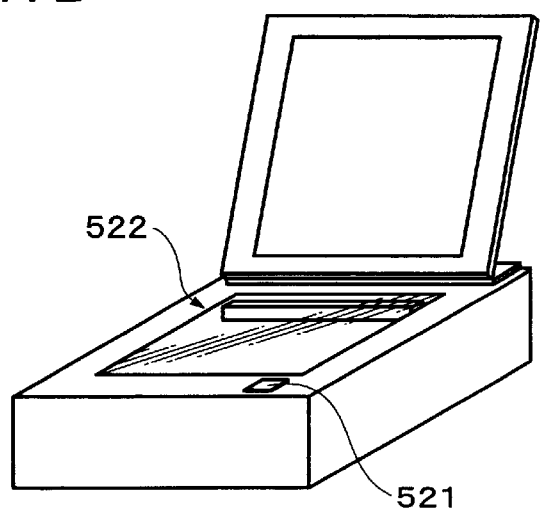

An internal block diagram of a scanner that is another example of electronic equipment is shown in FIG. 16B with an external view thereof being shown in FIG. 17B. A CPU 520 has various functions, including that of controlling the entire system. An operating section 521 is designed to enable the user to operate the scanner. Data such as a control program is stored in a ROM 526, and a RAM 527 functions as a work area for the CPU 520. A DMAC 528 is a DMA controller.

An image of a document is read in by an image read section (a device for fetching data) 522, which includes components such as a light source and an opto-electric converter, and data of the read-in image is processed by an image processing section (a scanner engine) 524. The processed image data is sent to the integrated circuit device 500 by the CPU 520 or DMAC 528. The integrated circuit device 500 converts that parallel image data into serial data and sends it to another device such as a personal computer via USB.

Figure 16C:
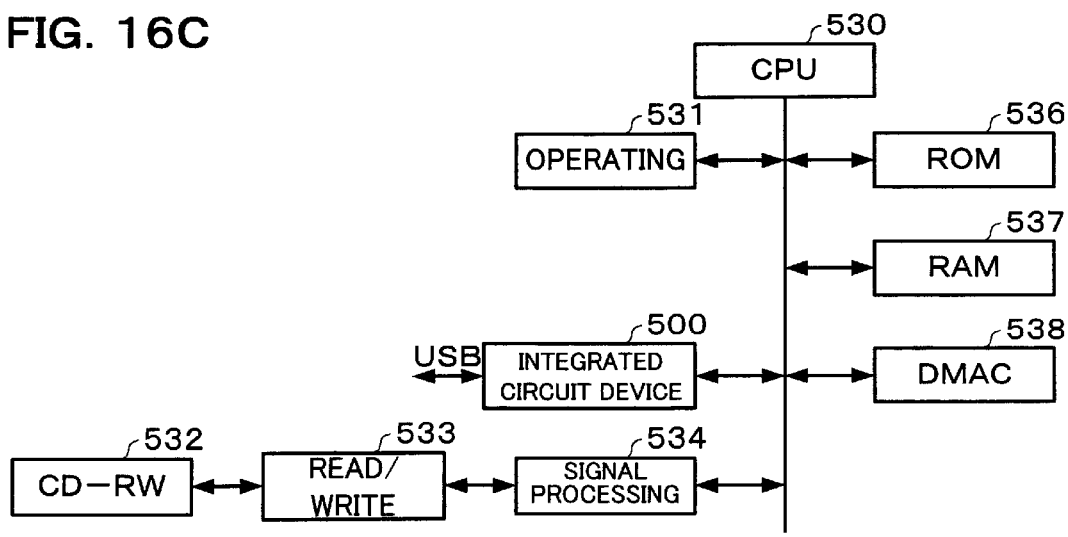
Figure 17C:
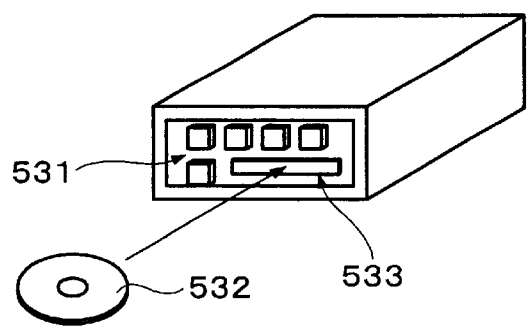

An internal block diagram of a CD-RW drive that is a further example of electronic equipment is shown in FIG. 16C with an external view thereof being shown in FIG. 17C. A CPU 530 has various functions, including that of controlling the entire system. An operating section 531 is designed to enable the user to operate the CD-RW drive. Data such as a control program is stored in a ROM 536, and a RAM 537 functions as a work area for the CPU 530. A DMAC 538 is a DMA controller.

Data read out from a CD-RW 532 by a read/write section (a device for fetching data or a device for storing data) 533, which includes components such as a laser, a motor, and an optical system, is input to a signal processing section 534 where it is subjected to given signal processing such as error correction. The data that has been subjected to this signal processing is sent to the integrated circuit device 500 by the CPU 530 or the DMAC 538. The integrated circuit device 500 converts this parallel data into serial data, then sends it to another device such as a personal computer via USB.

Serial data that comes in from another device via USB, on the other hand, is converted into parallel data by the integrated circuit device 500. This parallel data is sent to the signal processing section 534 by the CPU 530 or the DMAC 538. This parallel print data is subjected to given signal processing by the signal processing section 534 then is stored by the read/write section 533 on the CD-RW 532.

Note that a separate CPU for controlling data transfer by the data transfer control device 500 may be provided in addition to the CPU 510, 520, or 530 of FIGS. 16A, 16B, and 16C.

Use of the integrated circuit device of this embodiment of the present invention in electronic equipment makes it possible to implement data transfer in the HS mode laid down by USB 2.0. When a user uses a personal computer or the like to specify a printout, therefore, it is possible to complete printing with only a small time lag. In addition, the user can view an image that has been read in, with only a small time lag after a scanner has been instructed to fetch the image. This also makes it possible to read data from a CD-RW and write data to a CD-RW at high speed.

Use of the integrated circuit device of this embodiment in electronic equipment makes it possible to manufacture a integrated circuit device that enables data transfer in HS mode, even when using ordinary semiconductor processes with inexpensive fabrication costs. It is therefore possible to reduce the cost of the integrated circuit device and thus reduce the cost of the electronic equipment. In addition, it is possible to increase the reliability of data transfer, thus increasing the reliability of the electronic equipment.

Use of the integrated circuit device of this embodiment in electronic equipment makes it possible to respond to diverse demands from users fabricating the electronic equipment, while maintaining a high level of sophistication of the integrated circuit device, thus enabling an increase in the added value of the electronic equipment.

Note that the electronic equipment that can employ an integrated circuit device in accordance with the present invention is not limited to the above described embodiment, and thus various other examples can be considered, such as various types of optical disk drive (CD-ROM or DVD), magneto-optical (MO) disk drives, hard disk drives, TVs, VCRs, video cameras, audio equipment, telephones, projectors, personal computers, electronic organizers, and dedicated wordprocessors.

Note also that the present invention is not limited to the embodiment described herein, and various modifications are possible within the scope of the invention as laid out hereunder.

For example, the configuration of the integrated circuit device in accordance with the present invention is not limited to that shown in FIG. 2, and thus various modifications thereof are possible.

In addition, the layouts of the various circuits of the integrated circuit device of the present invention are not limited to the examples described with reference to FIGS. 3A to 15, and thus various modifications thereof can be conceived.

In addition, it is particularly desirable to apply the present invention to data transfer under USB 2.0, but the present invention is not limited thereto. For example, the present invention can also be applied to data transfer in accordance with a standard that is based on a concept similar to that of USB 2.0, or a standard that is developed from USB 2.0.

What is claimed is:

1. An integrated circuit device including a plurality of macrocells, the integrated circuit device comprising:

a first macrocell which includes at least a physical-layer circuit conforming to a given interface standard for performing data transfer through a bus, the physical-layer circuit of the first macrocell including an analog front-end circuit for data transfer through the bus; and a second macrocell which includes a circuit in an upper layer of the physical layer, wherein the first macrocell is placed in such a manner that a corner portion of the first macrocell that is a portion at which first and second sides of the first macrocell intersect is positioned at a corner portion of the integrated circuit device.

2. An integrated circuit device including a plurality of macrocells, the integrated circuit device comprising:

a first macrocell which includes at least a physical-layer circuit conforming to a given interface standard for performing data transfer through a bus; and a second macrocell which includes a circuit in an upper layer of the physical layer, wherein:

the first macrocell is placed in such a manner that a corner portion of the first macrocell that is a portion at which first and second sides of the first macrocell intersect is positioned at a corner portion of the integrated circuit device;

a data terminal connected to the bus of the given interface standard is placed in a first I/O region placed along the first side of the first macrocell; and at least one of a clock terminal, or a power terminal of a circuit that generates a clock for data transfer through the data terminal is placed in a second I/O region that is placed along the second side of the first macrocell.

3. An integrated circuit device including a plurality of macrocells. the integrated circuit device comprising:

a first macrocell which includes at least a physical-layer circuit conforming to a given interface standard for performing data transfer through a bus; and a second macrocell which includes a circuit in an upper layer of the physical layer, wherein:

the first macrocell is placed in such a manner that a corner portion of the first macrocell that is a portion at which first and second sides of the first macrocell intersect is positioned at a corner portion of the integrated circuit device; and an interface region for exchanging signals between the first and second macrocells is provided along at least one of a third side of the macrocell opposite to the first side and a fourth side opposite to the second side.

4. An integrated circuit device including a plurality of macrocells, the integrated circuit device comprising:

a first macrocell which includes at least a physical-layer circuit conforming to a given interface standard for performing data transfer through a bus; and a second macrocell which includes a circuit in an upper layer of the physical layer, wherein:

the first macrocell is placed in such a manner that a corner portion of the first macrocell that is a portion at which first and second sides of the first macrocell intersect is positioned at a corner portion of the integrated circuit device; and the first macrocell comprises:

a reception circuit which is connected to a data terminal connected to the bus of the given interface standard, and receives data through the data terminal;

a clock generation circuit which generates a clock of a given frequency; and a sampling clock generation circuit which generates a sampling clock for data transferred through the data terminal, based on a clock generated by the clock generation circuit, wherein the reception circuit is placed on a first direction side of a first I/O region placed along the first side of the first macrocell, the first direction being a direction from the first side toward a third side of the first macrocell, the third side being opposite to the first side, wherein the clock generation circuit is placed on a second direction side of a second I/O region placed along the second side of the first macrocell, the second direction being a direction from the second side toward a fourth side of the first macrocell, the fourth side being opposite to the second side, and wherein the sampling clock generation circuit is placed on the first direction side of the reception circuit and on the second direction side of the clock generation circuit.

5. The integrated circuit device as defined by claim 4, wherein the clock generation circuit generates first to Nth clocks having the same frequency and different phases, and wherein the sampling clock generation circuit comprises:
an edge detection circuit which detects between which edges among edges of the generated first to Nth clocks, a data edge exists; and
a clock selection circuit which selects one of the first to Nth clocks, based on edge detection information of the edge detection circuit, and outputs the selected clock as the sampling clock.

6. The integrated circuit device as defined by claim 4, wherein first power terminals which supply power sources to the clock generation circuit and second power terminals which supply power sources to the sampling clock generation circuit are placed in the second I/O region, wherein the clock generation circuit is placed adjacent to the first power terminals in the second direction, and wherein a region of a capacitive element is placed adjacent to the second power terminals in the second direction, one end of the capacitive element being connected to a power terminal for a higher potential of the second power terminals and the other end thereof being connected to a power terminal for a lower potential.

7. An integrated circuit device as including a plurality of macrocells. the integrated circuit device comprising:

a first macrocell which includes at least a physical-layer circuit conforming to a given interface standard for performing data transfer through a bus: and a second macrocell which includes a circuit in an upper layer of the physical layer, wherein:
the first macrocell is placed in such a manner that a corner portion of the first macrocell that is a portion at which first and second sides of the first macrocell intersect is positioned at a corner portion of the integrated circuit device; and
the first macrocell comprises:
a reception circuit which is connected to a data terminal connected to the bus of the given interface standard, and receives data through the data terminal; and
a detection circuit which is connected to the data terminal, and detects whether or not data received through the data terminal is valid, and wherein the reception circuit and the detection circuit are placed to be adjacent each other in a second direction, the second direction being a direction from the second side toward a fourth side of the first macrocell, the fourth side being opposite to the second side.

8. An integrated circuit device including a plurality of macrocells. the integrated circuit device comprising:

a first macrocell which includes at least a physical-layer circuit conforming to a given interface standard for performing data transfer through a bus; and a second macrocell which includes a circuit in an upper layer of the physical layer, wherein:
the first macrocell is placed in such a manner that a corner portion of the first macrocell that is a portion at which first and second sides of the first macrocell intersect is positioned at a corner portion of the integrated circuit device;
the first macrocell comprises:
a reception circuit which is connected to a data terminal connected to the bus of the given interface standard, and receives data through the data terminal; and
a transmission circuit which is connected to the data terminal, and transmits data through the data terminal,
wherein the transmission circuit is placed on a second direction side of the reception circuit, the second direction being a direction from the second side toward a fourth side of the first macrocell, the fourth side being opposite to the second side.

9. An integrated circuit device including a plurality of macrocells. the integrated circuit device comprising:

a first macrocell which includes at least a physical-layer circuit conforming to a given interface standard for performing data transfer through a bus; and a second macrocell which includes a circuit in an upper layer of the physical layer, wherein:
the first macrocell is placed in such a manner that a corner portion of the first macrocell that is a portion at which first and second sides of the first macrocell intersect is positioned at a corner portion of the integrated circuit device; and
the first macrocell comprises:
a reception circuit which is connected to a data terminal connected to the bus of the given interface standard, and receives data through the data terminal; and
a transmission circuit which is connected to the data terminal, and transmits data through the data terminal, and
wherein the transmission circuit and the data terminal are placed to be adjacent in the first direction, the first direction being a direction from the first side toward a third side of the first macrocell, the third side being opposite to the first side.

10. An integrated circuit device including a plurality of macrocells, the integrated circuit device comprising:

a first macrocell which includes at least a physical-layer circuit conforming to a given interface standard for performing data transfer through a bus; and a second macrocell which includes a circuit in an upper layer of the physical layer, wherein:
the first macrocell is placed in such a manner that a corner portion of the first macrocell that is a portion at which first and second sides of the first macrocell intersect is positioned at a corner portion of the integrated circuit device;

the first macrocell is a macrocell, of which routing and circuit cell placement are fixed; and the second macrocell is a macrocell, of which routing and circuit cell placement are automatically carried out.

11. The integrated circuit device as defined by claim 2, wherein the first macrocell is a macrocell, of which routing and circuit cell placement are fixed; and wherein the second macrocell is a macrocell, of which routing and circuit cell placement are automatically carried out.

12. The integrated circuit device as defined by claim 4, wherein the first macrocell is a macrocell, of which routing and circuit cell placement are fixed; and wherein the second macrocell is a macrocell, of which routing and circuit cell placement are automatically carried out.

13. The integrated circuit device as defined by claim 7, wherein the first macrocell is a macrocell, of which routing and circuit cell placement are fixed; and wherein the second macrocell is a macrocell, of which routing and circuit cell placement are automatically carried out.

14. The integrated circuit device as defined by claim 8, wherein the first macrocell is a macrocell, of which routing and circuit cell placement are fixed; and wherein the second macrocell is a macrocell, of which routing and circuit cell placement are automatically carried out.

15. The integrated circuit device as defined by claim 9, wherein the first macrocell is a macrocell, of which routing and circuit cell placement are fixed; and wherein the second macrocell is a macrocell, of which routing and circuit cell placement are automatically carried out.

16. The An integrated circuit device including a plurality of macrocells, the integrated circuit device comprising:

a first macrocell which includes at least a physical-layer circuit conforming to a given interface standard for performing data transfer through a bus; and a second macrocell which includes a circuit in an upper layer of the physical layer, wherein:

the first macrocell is placed in such a manner that a corner portion of the first macrocell that is a portion at which first and second sides of the first macrocell intersect is positioned at a corner portion of the integrated circuit device; and the given interface standard is the universal serial bus (USB) standard.

17. The integrated circuit device as defined by claim 2, the given interface standard is the universal serial bus (USB) standard.

18. The integrated circuit device as defined by claim 4, wherein the given interface standard is the universal serial bus (USB) standard.

19. The integrated circuit device as defined by claim 7, wherein the given interface standard is the universal serial bus (USB) standard.

20. The integrated circuit device as defined by claim 8, wherein the given interface standard is the universal serial bus (USB) standard.

21. The integrated circuit device as defined by claim 9, wherein the given interface standard is the universal serial bus (USB) standard.

22. Electronic equipment comprising:

an integrated circuit device including a plurality of macrocells, the integrated circuit device comprising:

a first macrocell which includes at least a physical-layer circuit conforming to a given interface standard for performing data transfer through a bus; and a second macrocell which includes a circuit in an upper layer of the physical layer, wherein the first macrocell is placed in such a manner that a corner portion of the first macrocell that is a portion at which first and second sides of the first macrocell intersect is positioned at a corner portion of the integrated circuit device; and a device which performs output processing, fetch processing, or storage processing on data transferred through the integrated circuit device and the bus.

23. Electronic equipment comprising:

the integrated circuit device as defined by claim 2; and a device which performs output processing, fetch processing, or storage processing on data transferred through the integrated circuit device and the bus.

24. Electronic equipment comprising:

the integrated circuit device as defined by claim 4; and a device which performs output processing, fetch processing, or storage processing on data transferred through the integrated circuit device and the bus.

25. Electronic equipment comprising:

the integrated circuit device as defined by claim 7; and a device which performs output processing, fetch processing, or storage processing on data transferred through the integrated circuit device and the bus.

26. Electronic equipment comprising:

the integrated circuit device as defined by claim 8; and a device which performs output processing, fetch processing, or storage processing on data transferred through the integrated circuit device and the bus.

27. Electronic equipment comprising:

the integrated circuit device as defined by claim 9; and a device which performs output processing, fetch processing, or storage processing on data transferred through the integrated circuit device and the bus.

28. A method of placing an integrated circuit device that includes a first macrocell which includes at least a physical-layer circuit conforming to a given interface standard for performing data transfer through a bus, the physical-layer circuit of the first macrocell including an analog front-end circuit for data transfer through the bus; and a second macrocell which includes a circuit in an upper layer of the physical layer, the method comprising:

placing the first macrocell in such a manner that a corner portion of the first macrocell that is a portion at which first and second sides of the first macrocell intersect is positioned at a cornet portion of the integrated circuit device.

29. A method of placing an integrated circuit device that includes a first macrocell which includes at least a physical-layer circuit conforming to a given interface standard for performing data transfer through a bus; and a second macrocell which includes a circuit in an upper layer of the physical layer, the method comprising:

placing the first macrocell in such a manner that a corner portion of the first macrocell that is a portion at which first and second sides of the first macrocell intersect is positioned at a corner portion of the integrated circuit device;

placing a data terminal connected to the bus of the given interface standard in a first I/O region placed along the first side of the first macrocell; and placing at least one of a clock terminal, or a power terminal of a circuit that generates a clock for data transfer through the data terminal in a second I/O region that is placed along the second side of the first macrocell.

30. A method of placing an integrated circuit device that includes a first macrocell which includes at least a physical-layer circuit conforming to a given interface standard for performing data transfer through a bus; and a second macrocell which includes a circuit in an upper layer of the physical layer, the method comprising:

placing the first macrocell in such a manner that a corner portion of the first macrocell that is a portion at which first and second sides of the first macrocell intersect is positioned at a corner portion of the integrated circuit device, wherein the first macrocell comprises:
a reception circuit which is connected to a data terminal connected to the bus of the given interface standard, and receives data through the data terminal;
a clock generation circuit which generates a clock of a given frequency; and
a sampling clock generation circuit which generates a sampling clock for data transferred through the data terminal, based on a clock generated by the clock generation circuit, and wherein the method further comprises:
placing the reception circuit on a first direction side of a first I/O region placed along the first side of the first macrocell, the first direction being a direction from the first side toward a third side of the first macrocell, the third side being opposite to the first side;
placing the clock generation circuit on a second direction side of a second I/O region placed along the second side of the first macrocell, the second direction being a direction from the second side toward a fourth side of the first macrocell, the fourth side being opposite to the second side; and
placing the sampling clock generation circuit on the first direction side of the reception circuit and on the second direction side of the clock generation circuit.

31. A method of placing an integrated circuit device that includes a first macrocell which includes at least a physical-layer circuit conforming to a given interface standard for performing data transfer through a bus; and a second macrocell which includes a circuit in an upper layer of the physical layer, the method comprising:

placing the first macrocell in such a manner that a corner portion of the first macrocell that is a portion at which first and second sides of the first macrocell intersect is positioned at a corner portion of the integrated circuit device, wherein the first macrocell comprises:
a reception circuit which is connected to a data terminal connected to the bus of the given interface standard, and receives data through the data terminal; and
a detection circuit which is connected to the data terminal, and detects whether or not data received through the data terminal is valid, and wherein the method further comprises placing the reception circuit and the detection circuit to be adjacent each other in a second direction, the second direction being a direction from the second side toward a fourth side of the first macrocell, the fourth side being opposite to the second side.

32. A method of placing an integrated circuit device that includes a first macrocell which includes at least a physical-layer circuit conforming to a given interface standard for performing data transfer through a bus; and a second macrocell which includes a circuit in an upper layer of the physical layer, the method comprising:

placing the first macrocell in such a manner that a corner portion of the first macrocell that is a portion at which first and second sides of the first macrocell intersect is positioned at a corner portion of the integrated circuit device, wherein the first macrocell comprises:
a reception circuit which is connected to a data terminal connected to the bus of the given interface standard, and receives data through the data terminal; and
a transmission circuit which is connected to the data terminal, and transmits data through the data terminal, and wherein the method further comprising:
placing the transmission circuit on a second direction side of the reception circuit, the second direction being a direction from the second side toward a fourth side of the first macrocell, the fourth side being opposite to the second side.

33. A method of placing an integrated circuit device that includes a first macrocell which includes at least a physical-layer circuit conforming to a given interface standard for performing data transfer through a bus; and a second macrocell which includes a circuit in an upper layer of the physical layer, the method comprising:

placing the first macrocell in such a manner that a corner portion of the first macrocell that is a portion at which first and second sides of the first macrocell intersect is positioned at a corner portion of the integrated circuit device, wherein the first macrocell comprises:
a reception circuit which is connected to a data terminal connected to the bus of the given interface standard, and receives data through the data terminal; and
a transmission circuit which is connected to the data terminal, and transmits data through the data terminal, and wherein the method further comprises:
placing the transmission circuit and the data terminal to be adjacent in the first direction, the first direction being a direction from the first side toward a third side of the first macrocell, the third side being opposite to the first side.

* * * * *